United States Patent
Versleegers

(10) Patent No.: US 10,180,540 B2
(45) Date of Patent: Jan. 15, 2019

(54) OPTICAL FIBER CLAMPING ASSEMBLY HAVING A PLURALITY OF CABLE CLAMP ARMS

(71) Applicant: Tyco Electronics Raychem BVBA, Kessel-Lo (BE)

(72) Inventor: Jozef C. M. Versleegers, Bree (BE)

(73) Assignee: CommScope Connectivity Belgium BVBA (BE)

(*) Notice: Subject to any disclaimer, the term of this patent is extended or adjusted under 35 U.S.C. 154(b) by 273 days.

(21) Appl. No.: 14/969,817

(22) Filed: Dec. 15, 2015

(65) Prior Publication Data

US 2016/0195680 A1 Jul. 7, 2016

Related U.S. Application Data

(60) Provisional application No. 62/092,195, filed on Dec. 15, 2014.

(51) Int. Cl.
| | |
|---|---|
| *H02G 1/12* | (2006.01) |
| *G02B 6/36* | (2006.01) |
| *G02B 6/245* | (2006.01) |

(52) U.S. Cl.
CPC .......... *G02B 6/3616* (2013.01); *G02B 6/245* (2013.01); *H02G 1/1256* (2013.01)

(58) Field of Classification Search
CPC ..... G02B 6/245; G02B 6/3616; H02G 1/1256
See application file for complete search history.

(56) References Cited

U.S. PATENT DOCUMENTS

| | | | |
|---|---|---|---|
| 4,745,828 A | 5/1988 | Stepan | |
| 4,869,135 A | 9/1989 | Hoffa | |
| 4,920,830 A | 5/1990 | Stepan | |
| 4,942,789 A | 7/1990 | Hoffa et al. | |
| 4,951,530 A * | 8/1990 | Cross | H02G 1/1265 |
| | | | 81/9.42 |
| 4,981,054 A | 1/1991 | Stepan | |
| 5,010,797 A | 4/1991 | Stepan | |
| 5,111,720 A | 5/1992 | Stepan | |
| 5,199,328 A | 4/1993 | Hoffa | |
| 5,243,882 A | 9/1993 | Stepan | |
| 5,361,184 A | 11/1994 | El-Sharkawi et al. | |
| 5,579,666 A | 12/1996 | Sakashita et al. | |
| 5,582,078 A | 12/1996 | Talley | |
| 5,596,802 A | 1/1997 | Koch et al. | |
| 5,896,786 A | 4/1999 | Akita | |
| 5,950,505 A * | 9/1999 | Locher | H02G 1/12 |
| | | | 30/90.6 |
| 6,176,155 B1 | 1/2001 | Palmowski et al. | |
| 6,286,393 B1 | 9/2001 | Messer et al. | |
| 6,321,621 B1 | 11/2001 | Stepan | |
| 6,561,061 B1 | 5/2003 | Stepan | |

(Continued)

*Primary Examiner* — Minh Trinh
(74) *Attorney, Agent, or Firm* — Merchant & Gould P.C.

(57) ABSTRACT

A cable clamp assembly quickly and efficiently secures to an exterior portion of a cable by clamping onto the cable with a predetermined amount of force so as to not cause damage to the cable. The cable clamp assembly is optimized for quick and efficient insertion and retraction of the cable from the cable clamp assembly. The cable clamp assembly includes a plurality of cable clamp arms that are arranged to surround a cable and simultaneously move towards a cable to apply force to the exterior section of the cable.

15 Claims, 34 Drawing Sheets

(56) References Cited

U.S. PATENT DOCUMENTS

| | | |
|---|---|---|
| 6,736,032 B2 | 5/2004 | Hombu |
| 6,910,256 B2 * | 6/2005 | Locher .................. H01R 43/05 |
| | | 29/564.4 |
| 7,140,273 B2 | 11/2006 | Palmowski et al. |
| 7,597,030 B2 | 10/2009 | Stepan et al. |
| 8,104,978 B2 * | 1/2012 | Lin ...................... G02B 6/3801 |
| | | 385/95 |
| 8,402,862 B2 | 3/2013 | Ji |
| 8,408,038 B2 | 4/2013 | Young |
| 8,438,952 B2 * | 5/2013 | Locher ................ H02G 1/1251 |
| | | 29/564.4 |
| 2013/0269487 A1 | 10/2013 | Sumino et al. |

* cited by examiner

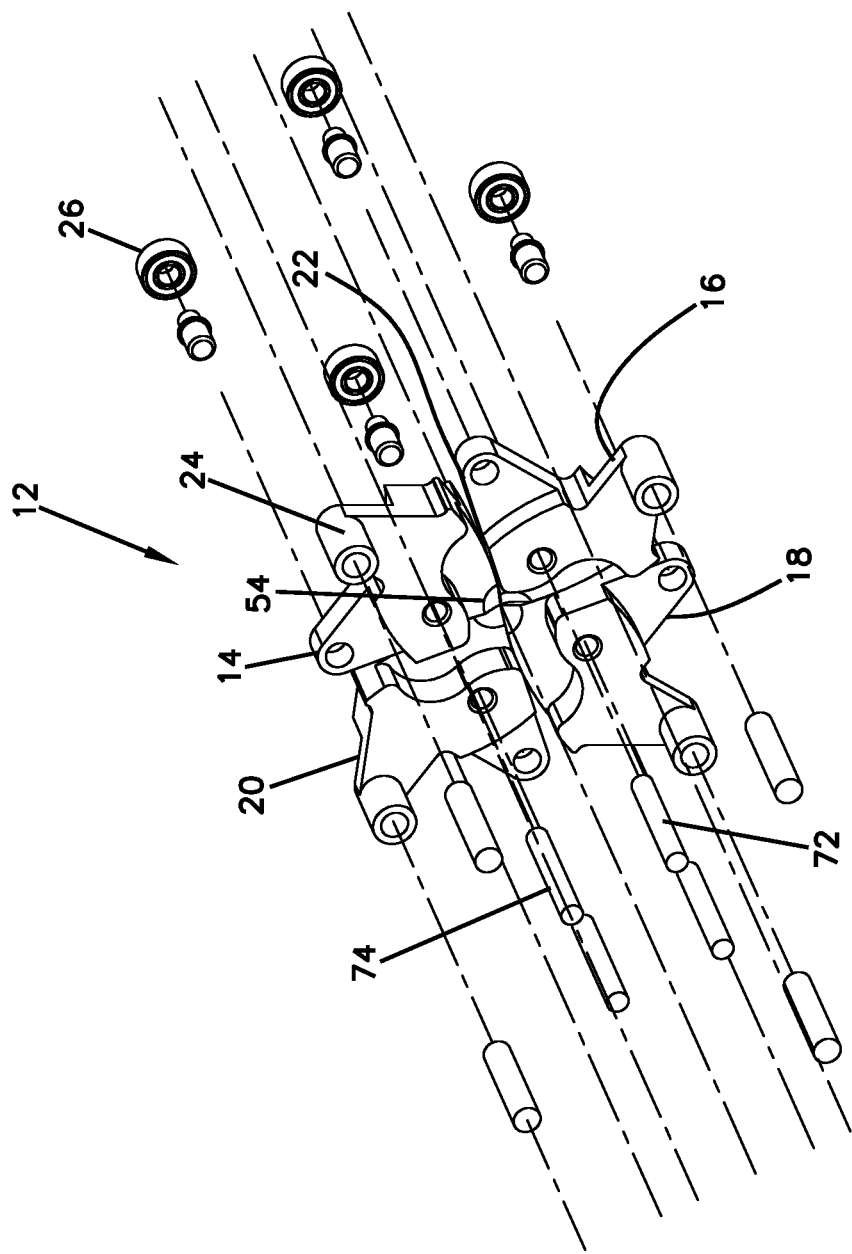

OPTICAL FIBER CLAMPING ASSEMBLY HAVING A PLURALITY OF CABLE CLAMP ARMS

CROSS REFERENCE TO RELATED APPLICATION

This application claims priority to U.S. Provisional Application Ser. No. 62/092,195, filed on Dec. 15, 2014, entitled SELF-CENTERING OPTICAL FIBER CLAMP, the disclosure of which is incorporated by reference herein in its entirety.

BACKGROUND

Devices have been developed to secure optical and electrical cables in place while they are stripped and connectorized. Improved devices that are easy to operate, reliable, and do not damage the cables are desirable.

SUMMARY

The present disclosure provides a device and related method for securing cables as they are stripped and connectorized or otherwise processed. The device is designed to quickly and efficiently secure an exterior portion of a cable by clamping onto the cable with a predetermined amount of force so as to not cause damage to the cable yet hold the cable securely. The device is also optimized for quick and efficient insertion and retraction of the cable from the device.

A multi-clamp device to fix and center an optical fiber is provided in one embodiment. The clamps enclose the fiber buffer without gaps, which makes it possible to use higher pressure without damaging the internal fiber cladding. The high clamping force is desired to prevent axial slipping of the glass through the buffer during stripping or cleaving of the optical fiber.

BRIEF DESCRIPTION OF THE DRAWINGS

FIG. 3B is an enlarged portion of FIG. 3;

DETAILED DESCRIPTION

Referring to FIGS. 1-19, an embodiment of a cable clamping assembly according to the present disclosure is described below. In the depicted embodiment, the cable clamping assembly 10 can be a stand-alone device or, alternatively, it can be a module in a larger cable processing system that includes other modules. For example, the cable clamp assembly of the present disclosure could be axially aligned with a cable stripping module, a module that connectorizes the cable strands, overmolding modules, or any number of other modules to form part of a larger system.

When an optical fiber end has to be stripped or cleaved, for example, an axial force is exerted between the fiber buffer and the fiber glass. Therefore, it is necessary to clamp the fiber buffer during this process. In many cases it is detrimental if the fiber glass slips inside the fiber buffer while in the clamp. Slipping can be especially problematic with the semi-tight fibers. If clamping is done between two flat clamps, when the clamping force is increased, the buffer can be cut and the glass can be damaged. The present disclosure includes multiple clamps, such as four clamps, that form a closed clamping area. These clamps can move in and out relative to each other such that there is no gap between them. This coordinated movement performs a self-centering function and will support easy fiber infeed, and therefore it is possible to apply a very high pressure on the fiber buffer without damaging the glass inside.

Figure 1:
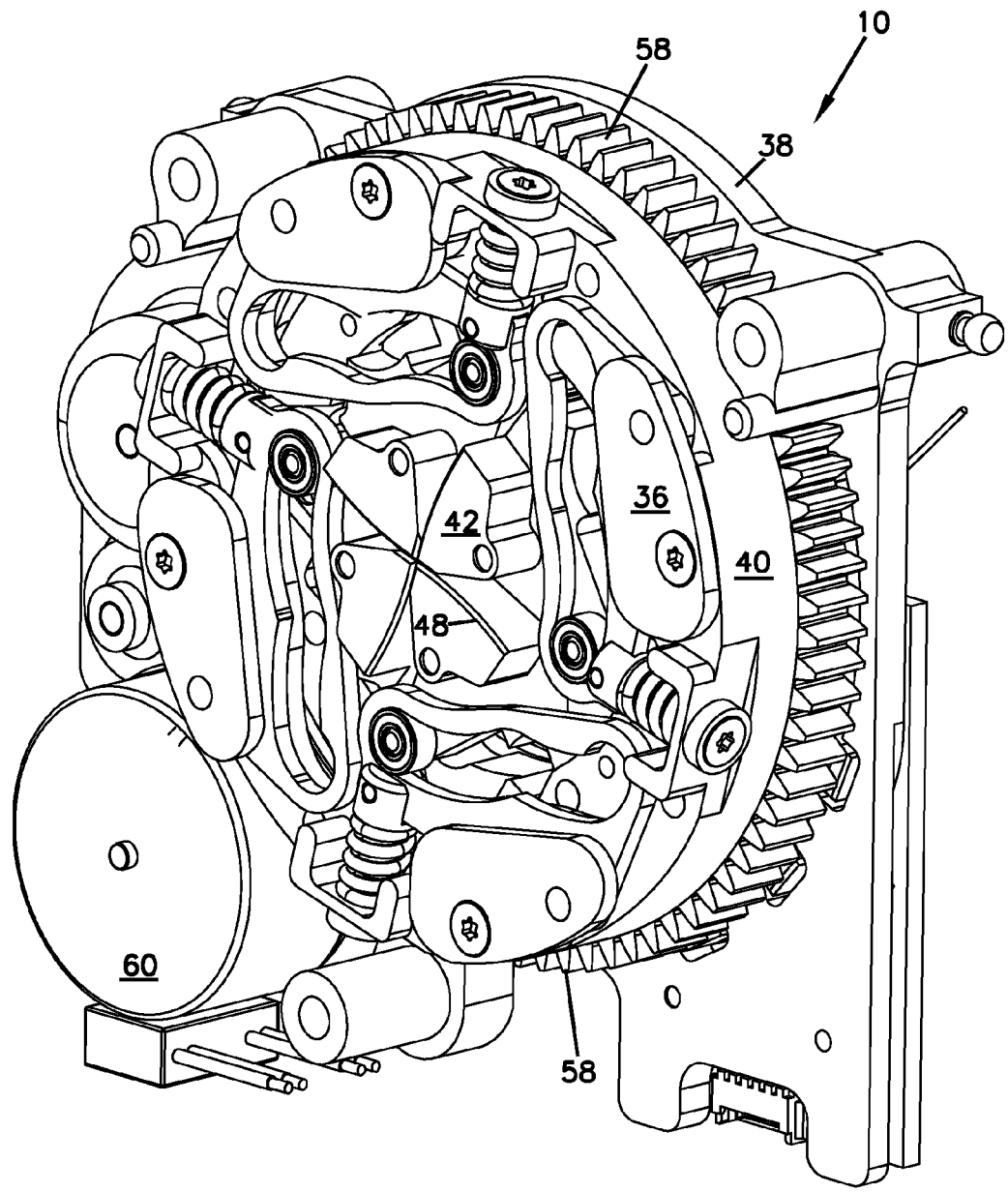
FIG. 1 is a rear perspective view of a cable clamp assembly according to principles of the present disclosure.
Figure 2:
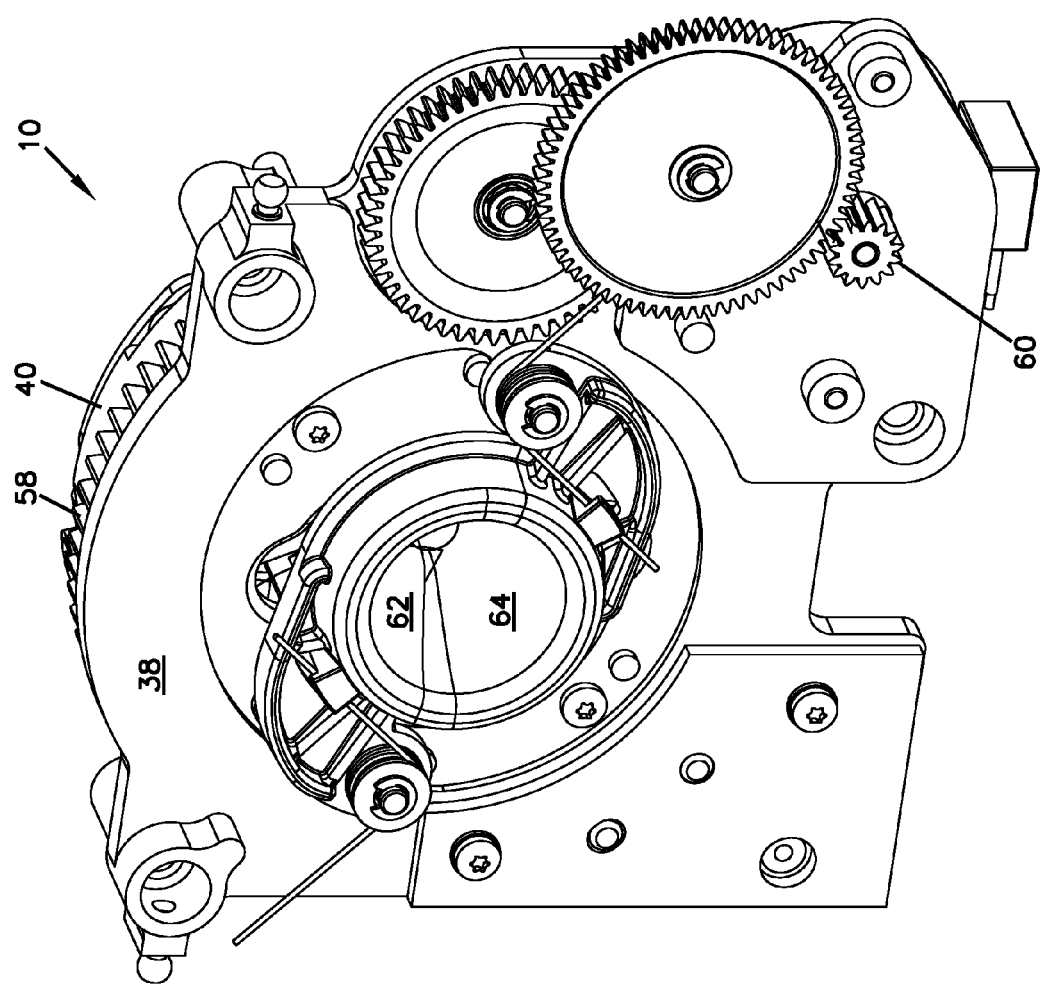
FIG. 2 is a front perspective of the cable clamp assembly of FIG. 1.
Figure 3:
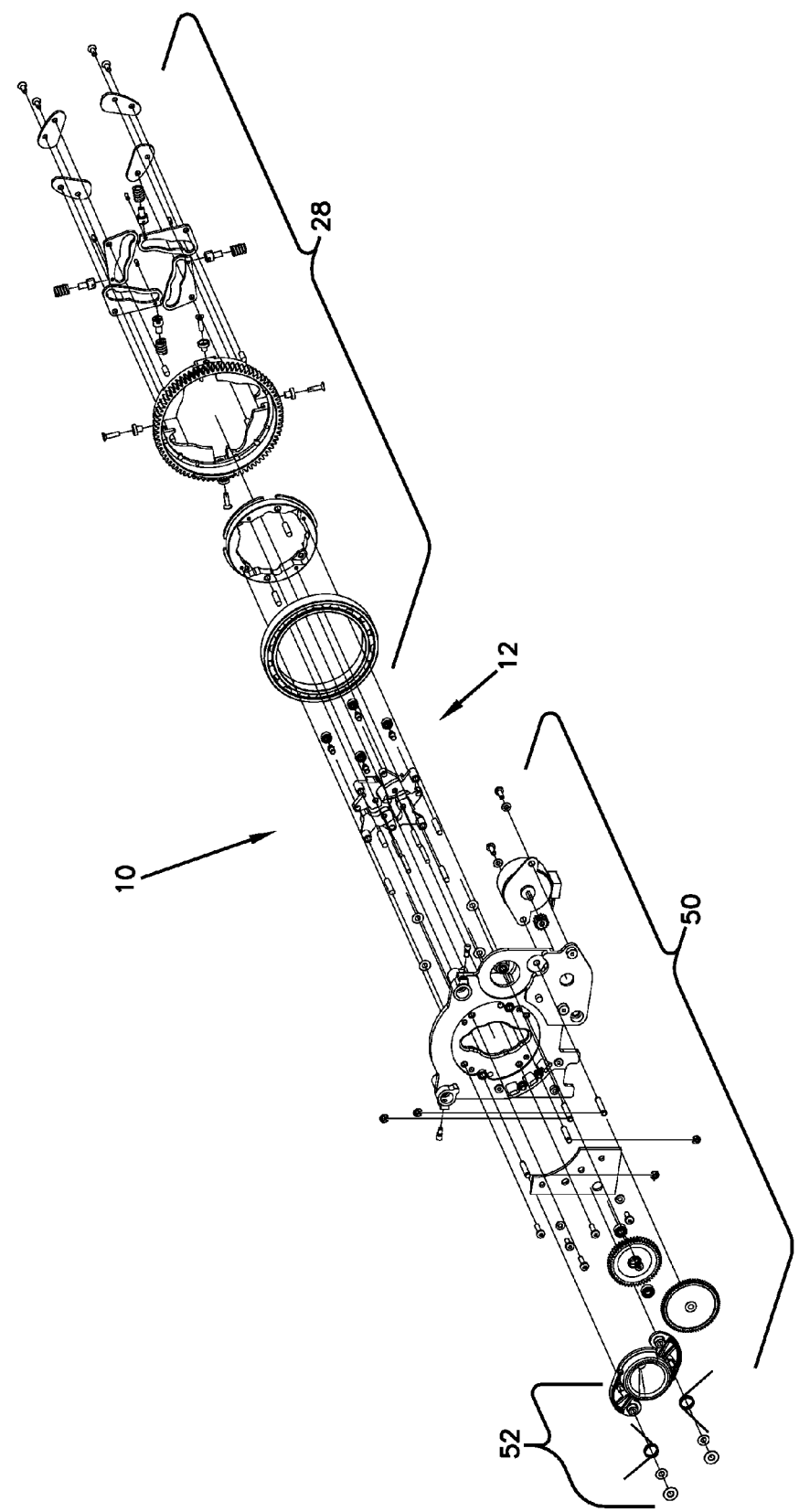
FIG. 3 is a front exploded view of the cable clamp assembly of FIG. 1.
Figure 3A:
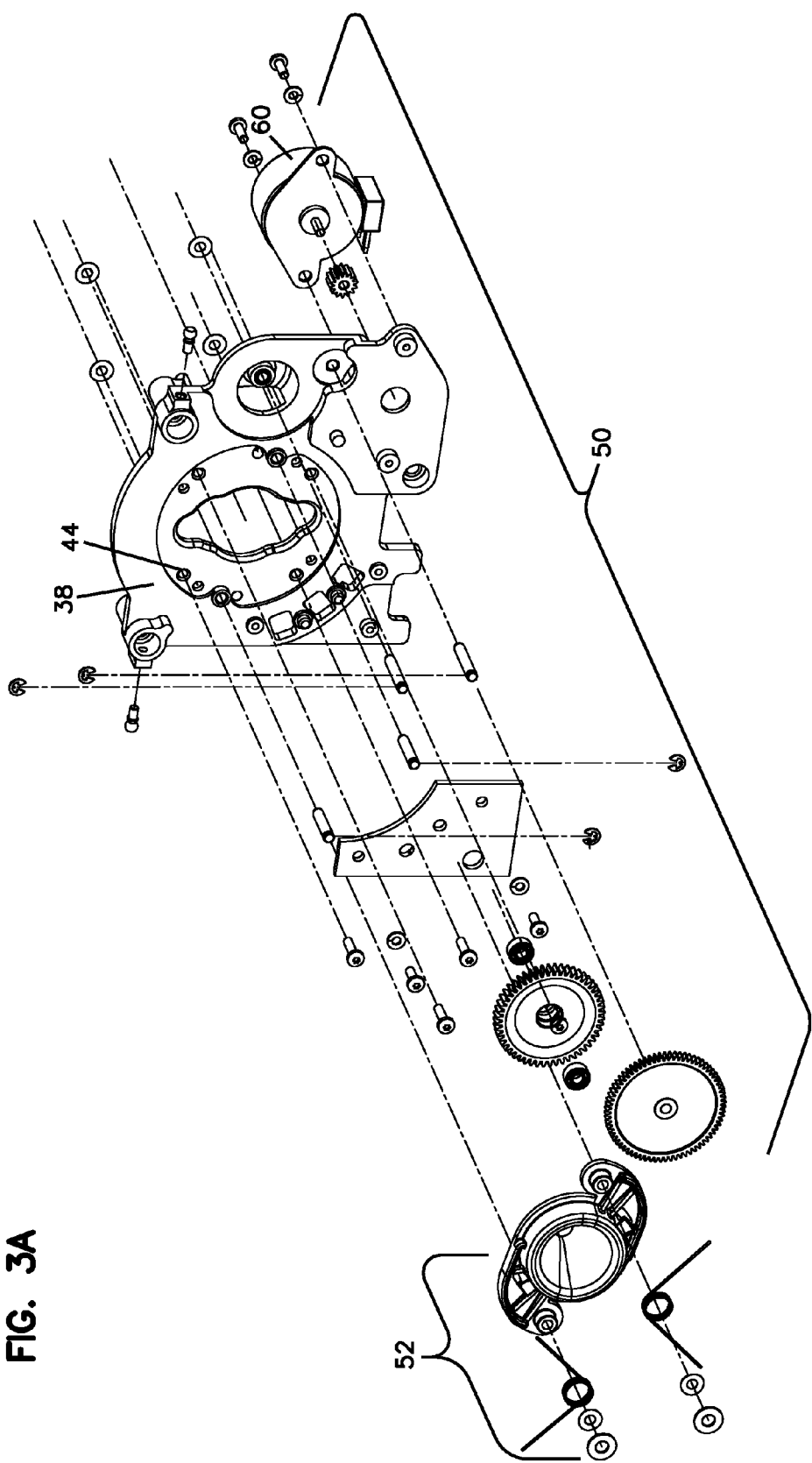
FIG. 3A is an enlarged portion of FIG. 3.
Figure 3C:
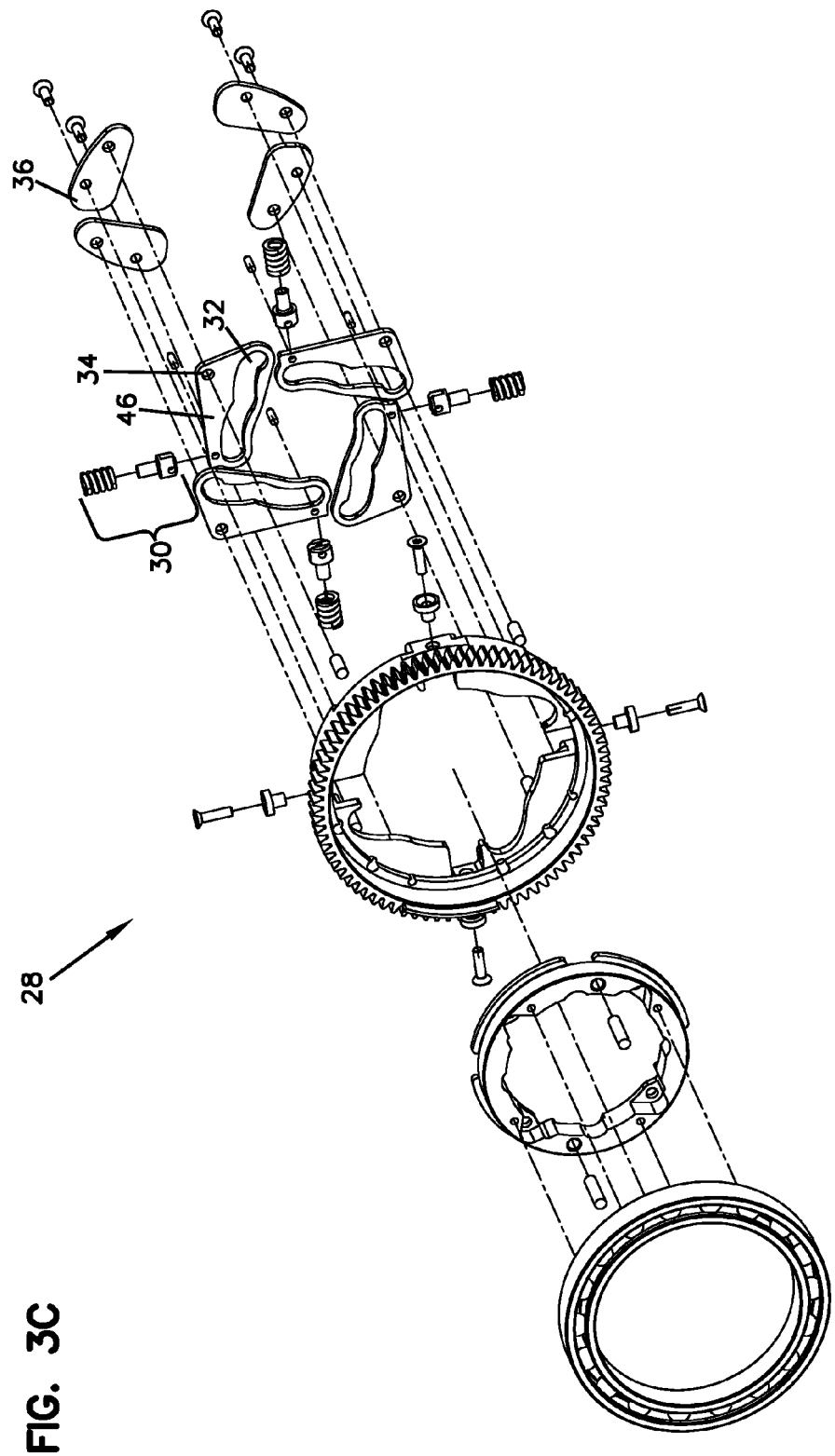
FIG. 3C is an enlarged portion of FIG. 3.
Figure 4:
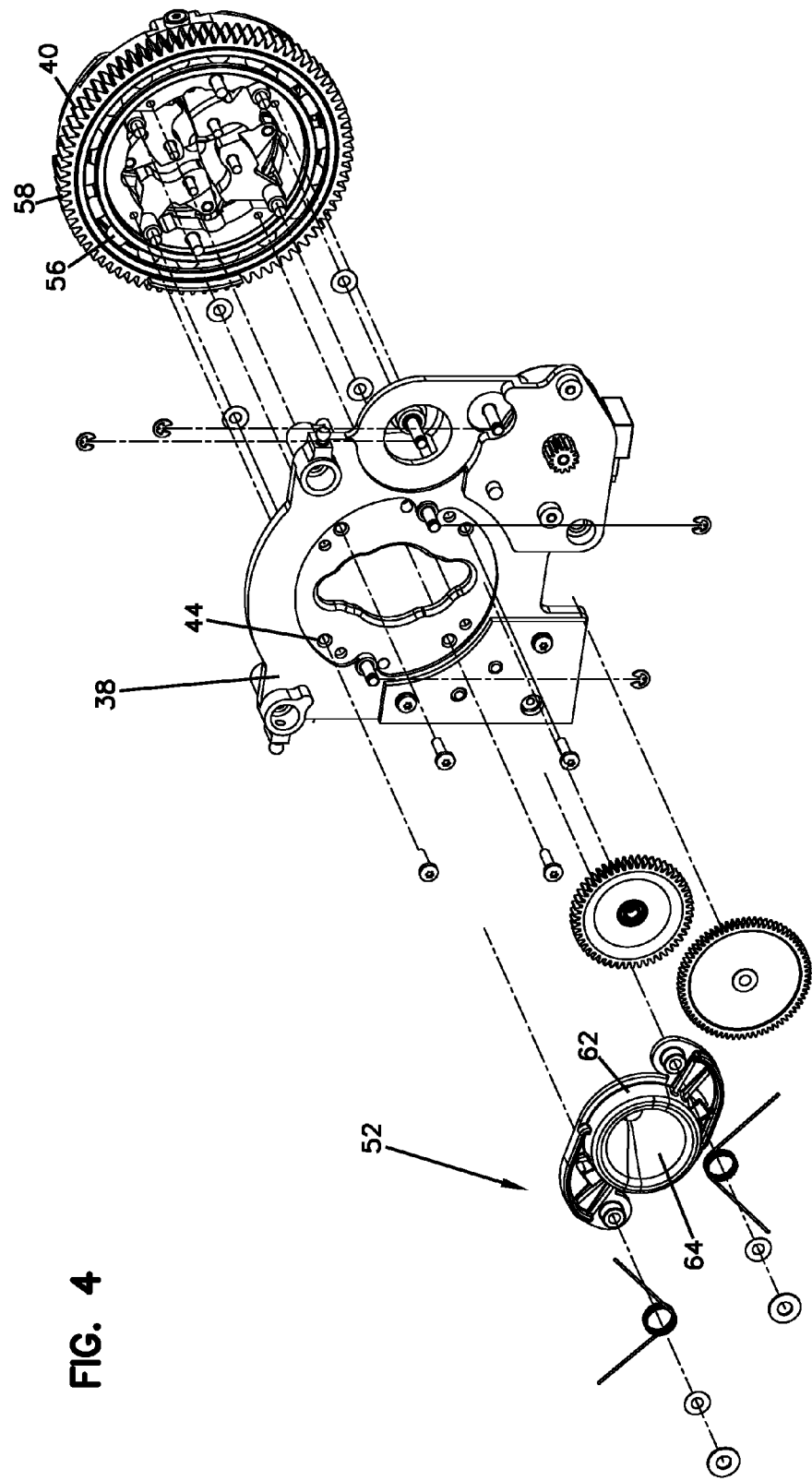
FIG. 4 is a front partially exploded view of the cable clamp assembly of FIG. 1.
Figure 5:
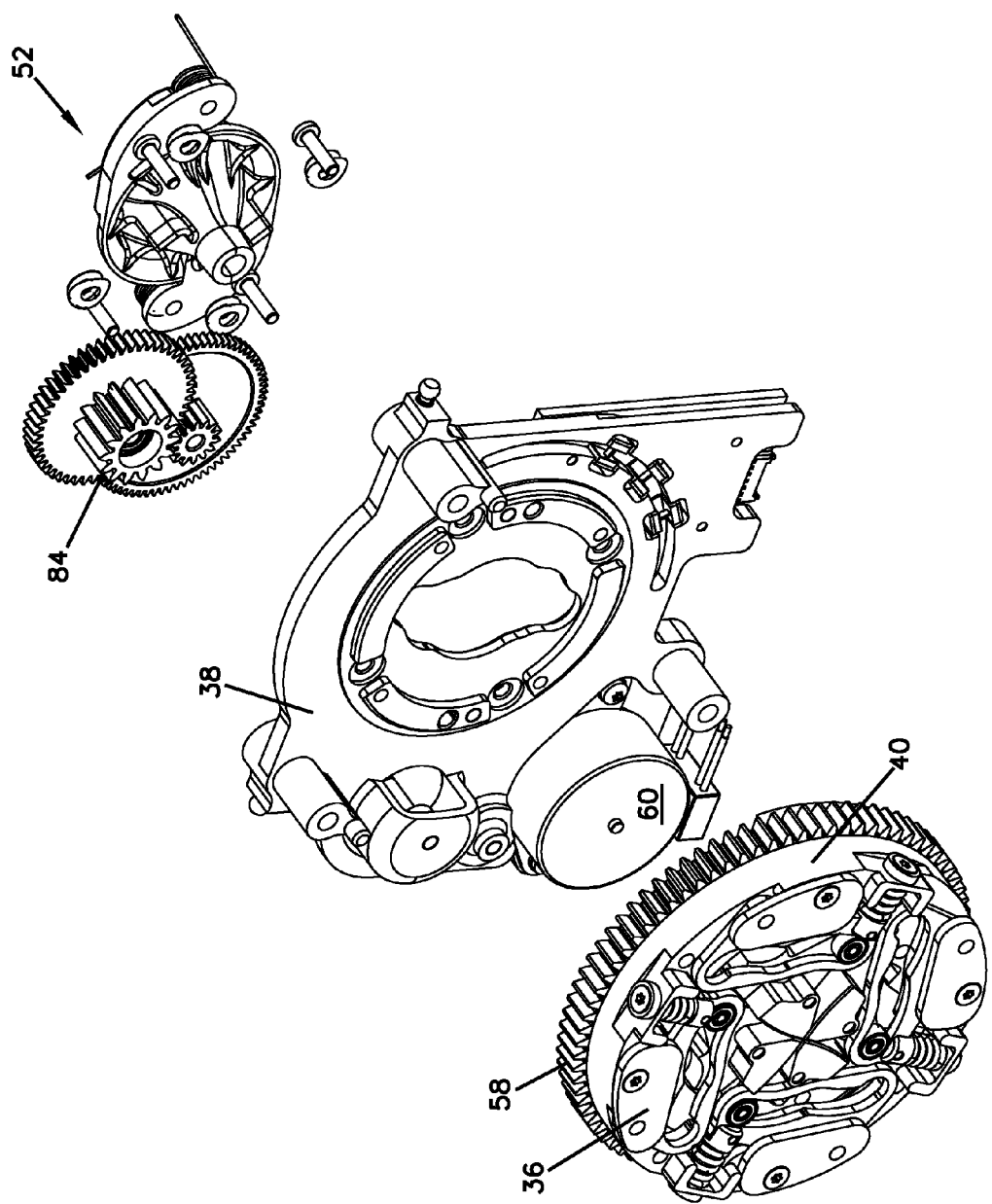
FIG. 5 is a rear partially exploded view of the cable clamp assembly of FIG. 1.
Figure 6:
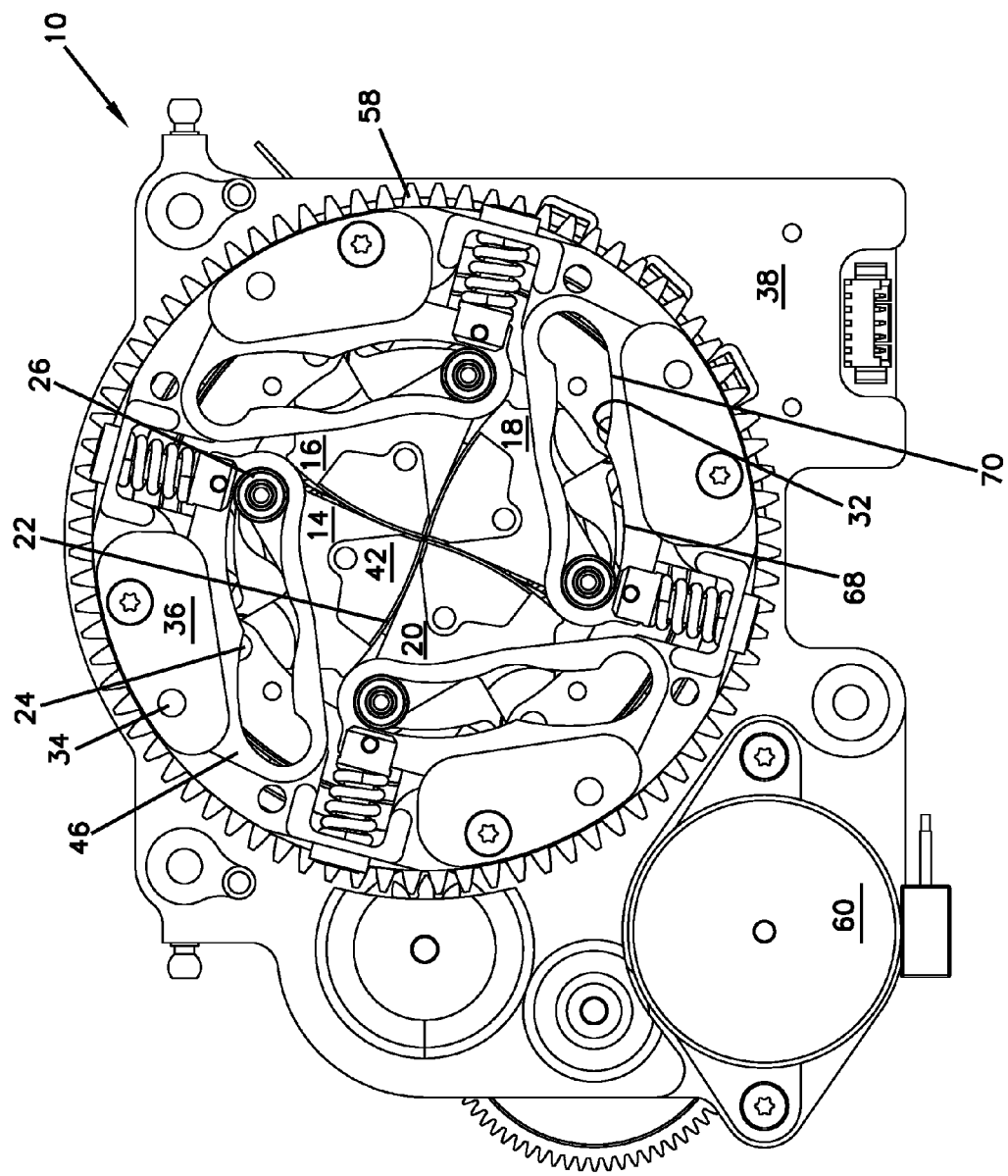
FIG. 6 is a rear view of the cable clamp assembly in a first state.
Figure 7:
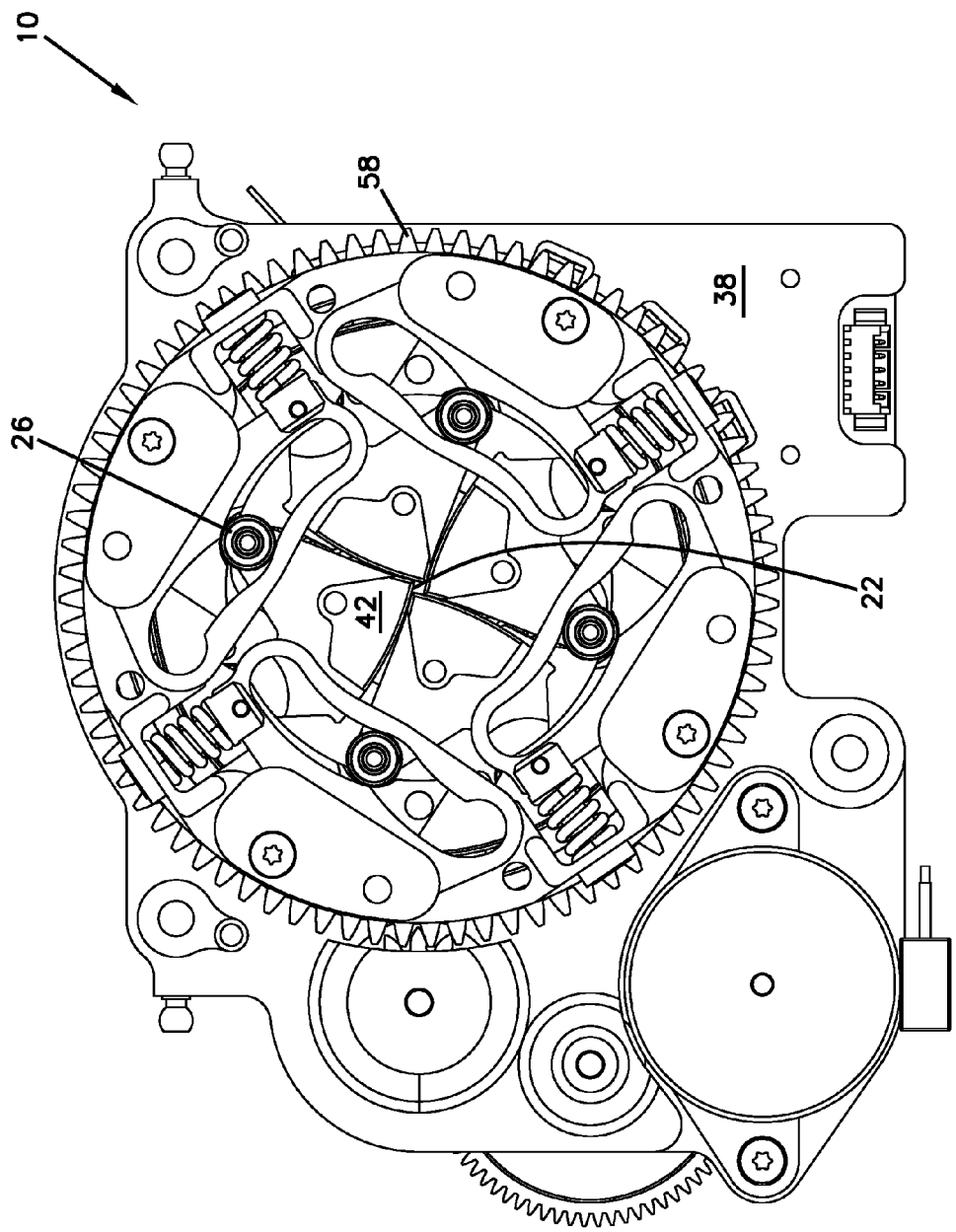
FIG. 7 is a rear view of the cable clamp assembly in a second state.
Figure 8:
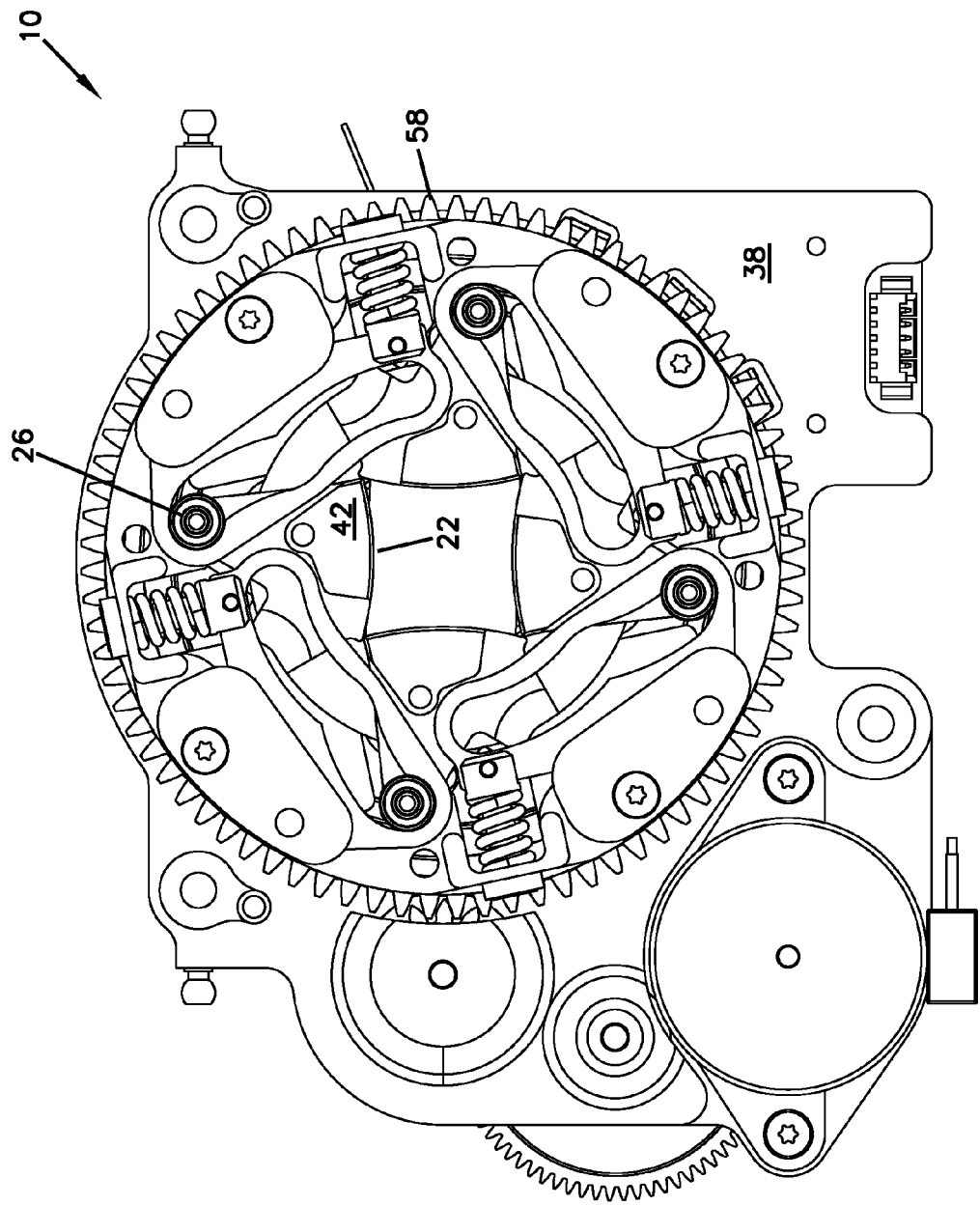
FIG. 8 is a rear view of the cable clamp assembly in a third state.
Figure 9:
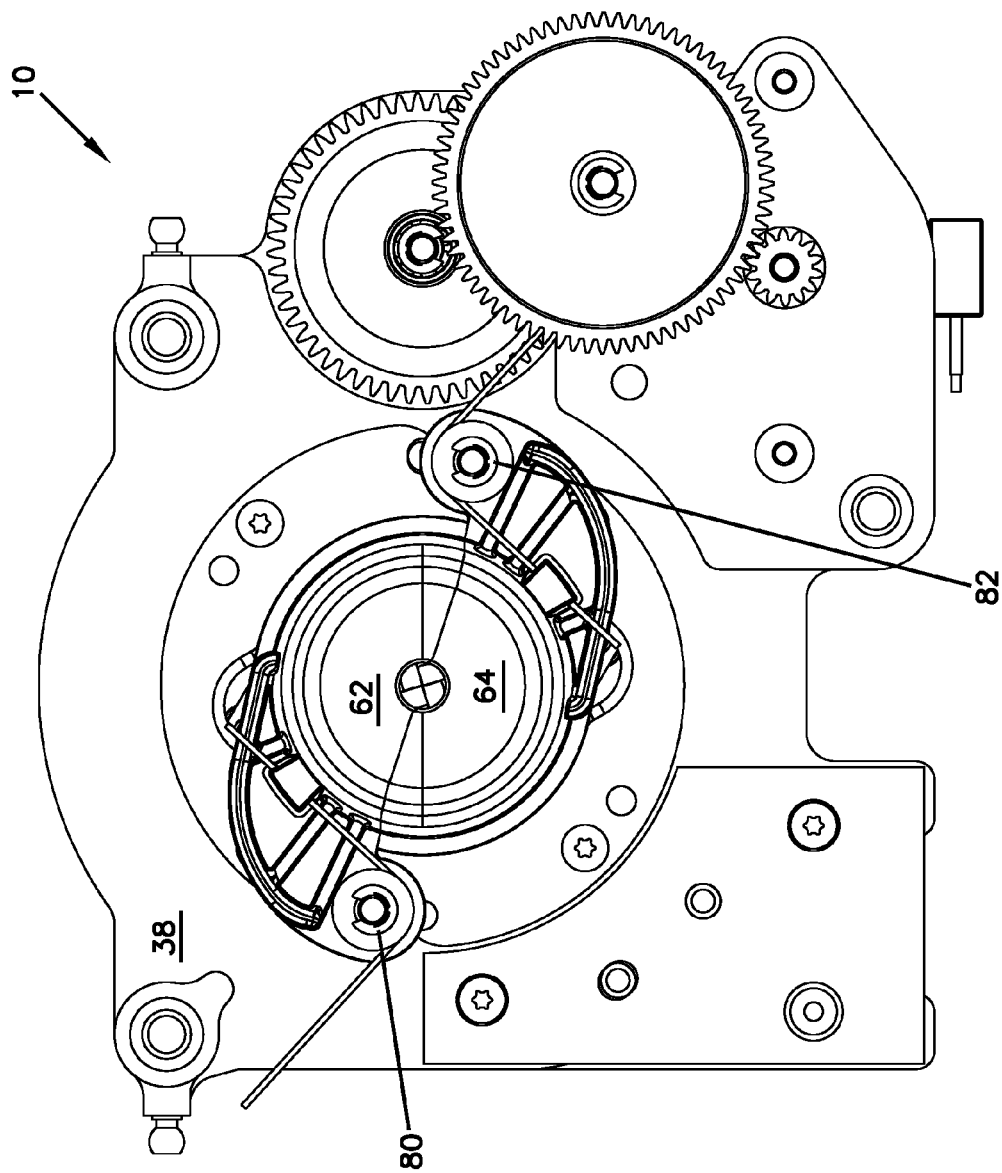
FIG. 9 is a front view of the cable clamp assembly in the first state.
Figure 10:
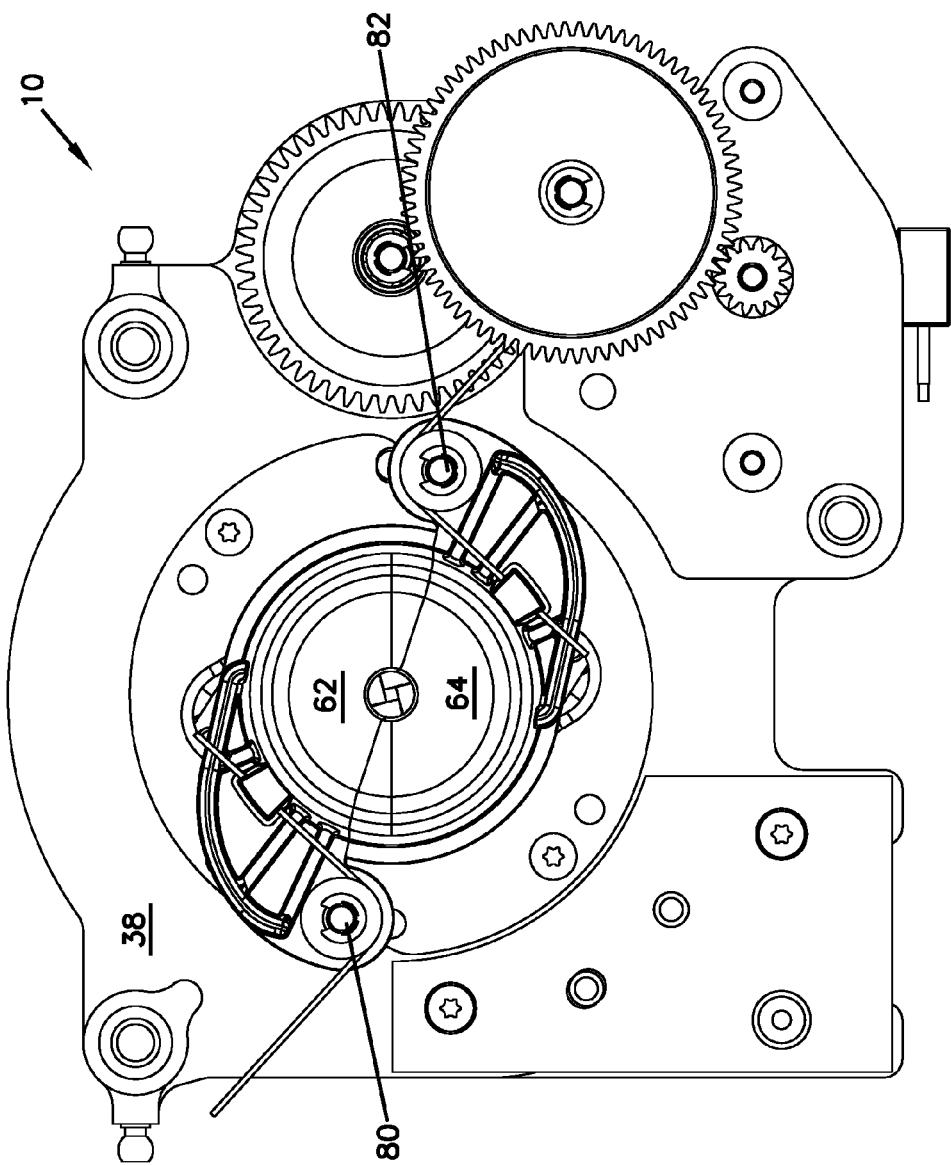
FIG. 10 is a front view of the cable clamp assembly in the second state.
Figure 11:
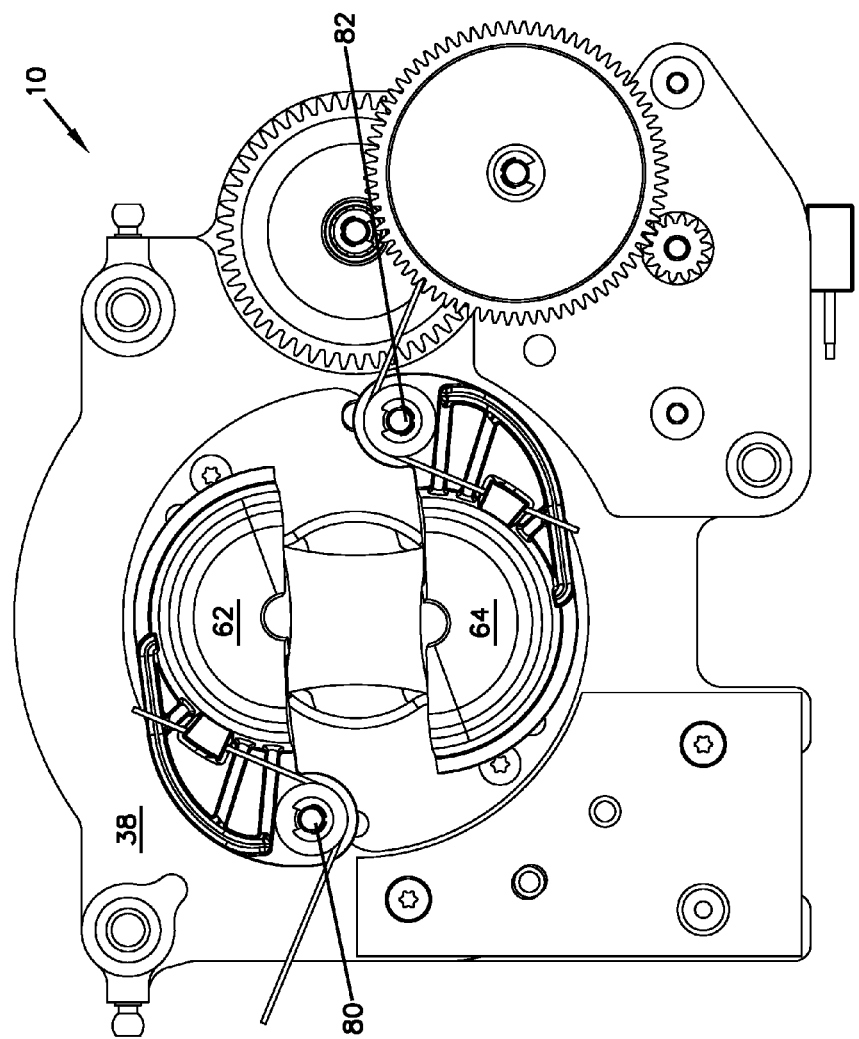
FIG. 11 is a front view of the cable clamp assembly in the third state.
Figure 12:
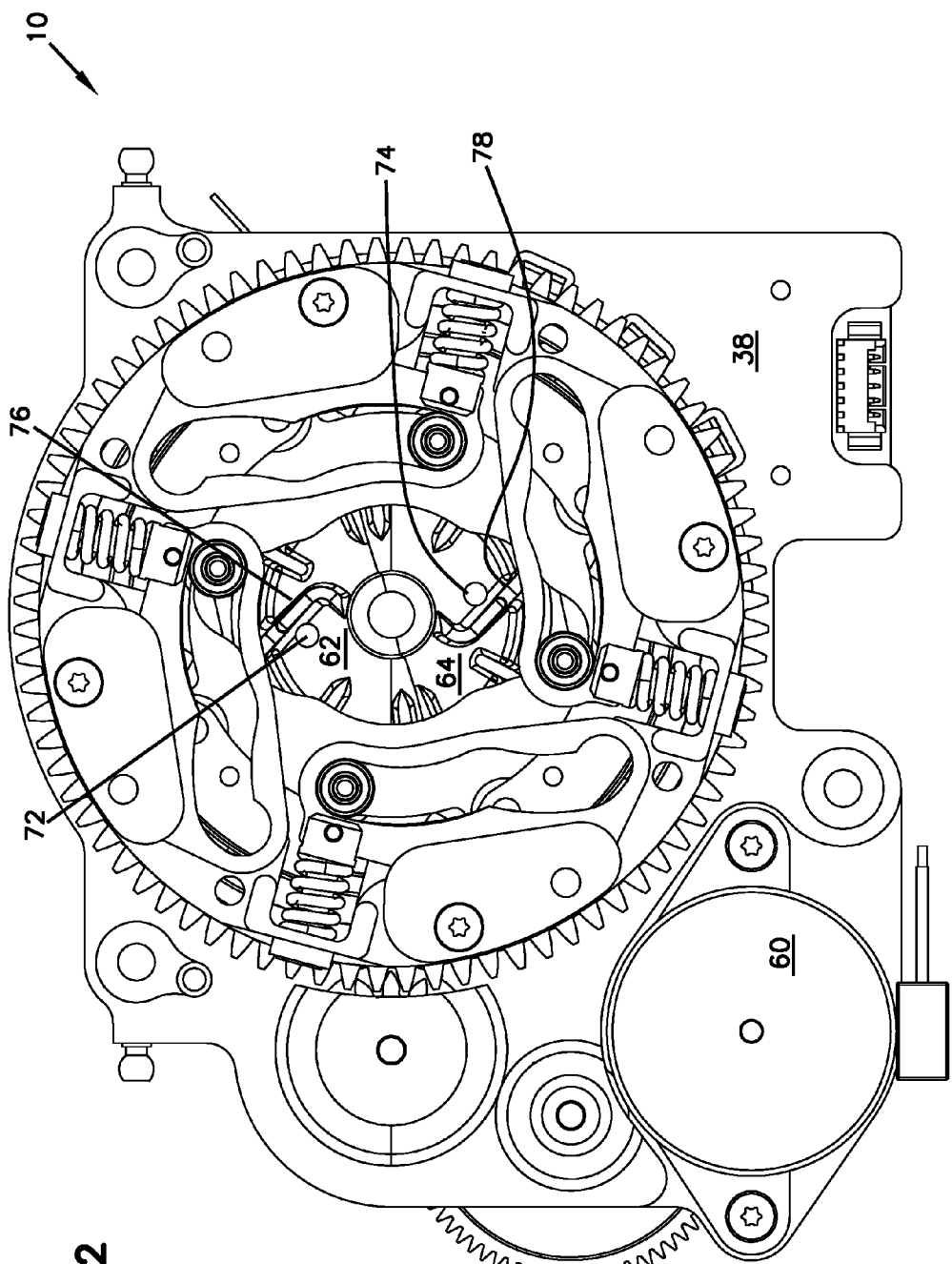
FIG. 12 is a rear view of the cable clamp assembly in the first state with portions removed.
Figure 13:
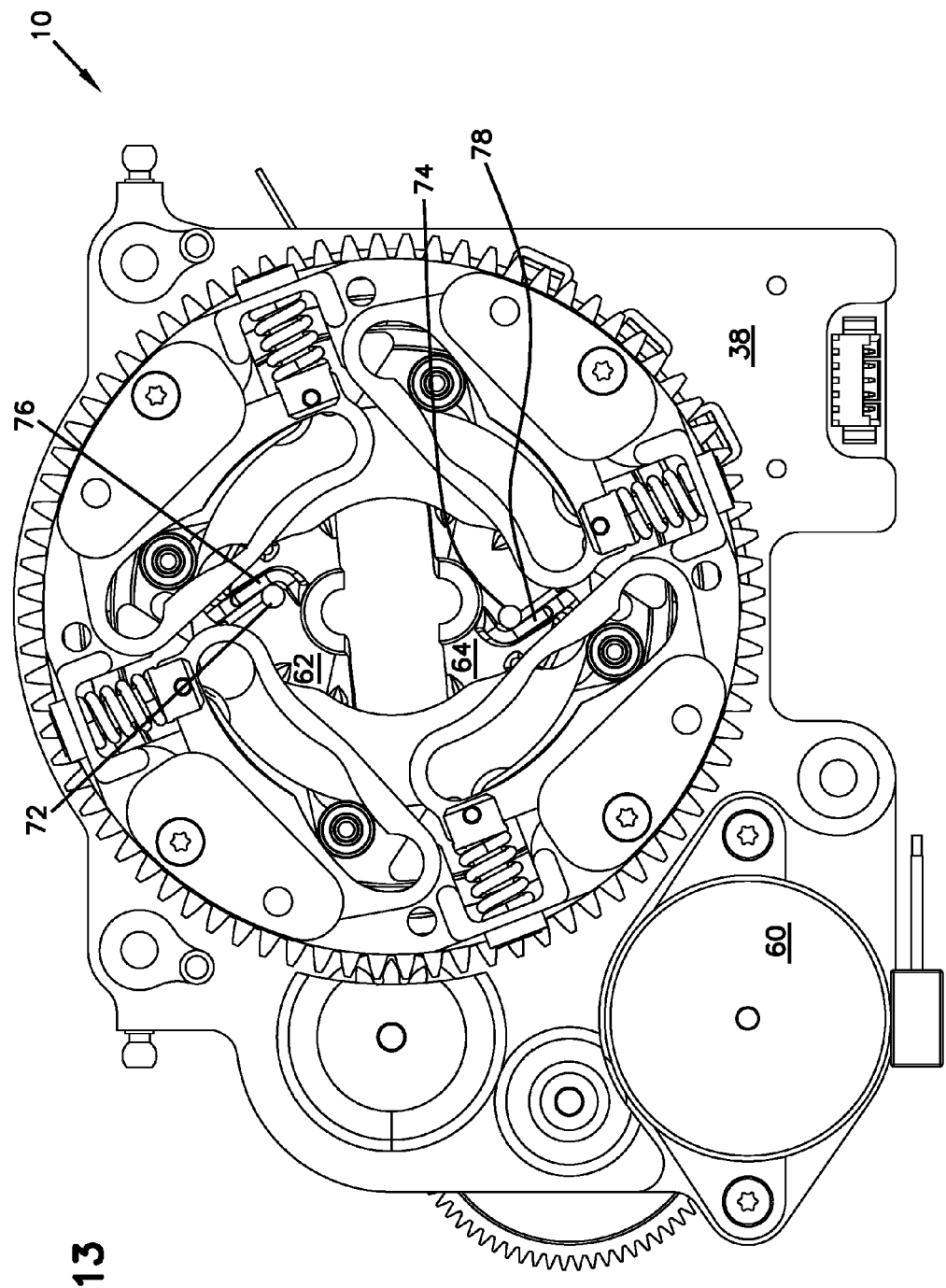
FIG. 13 is a rear view of the cable clamp assembly in the second state with portions removed.
Figure 14:
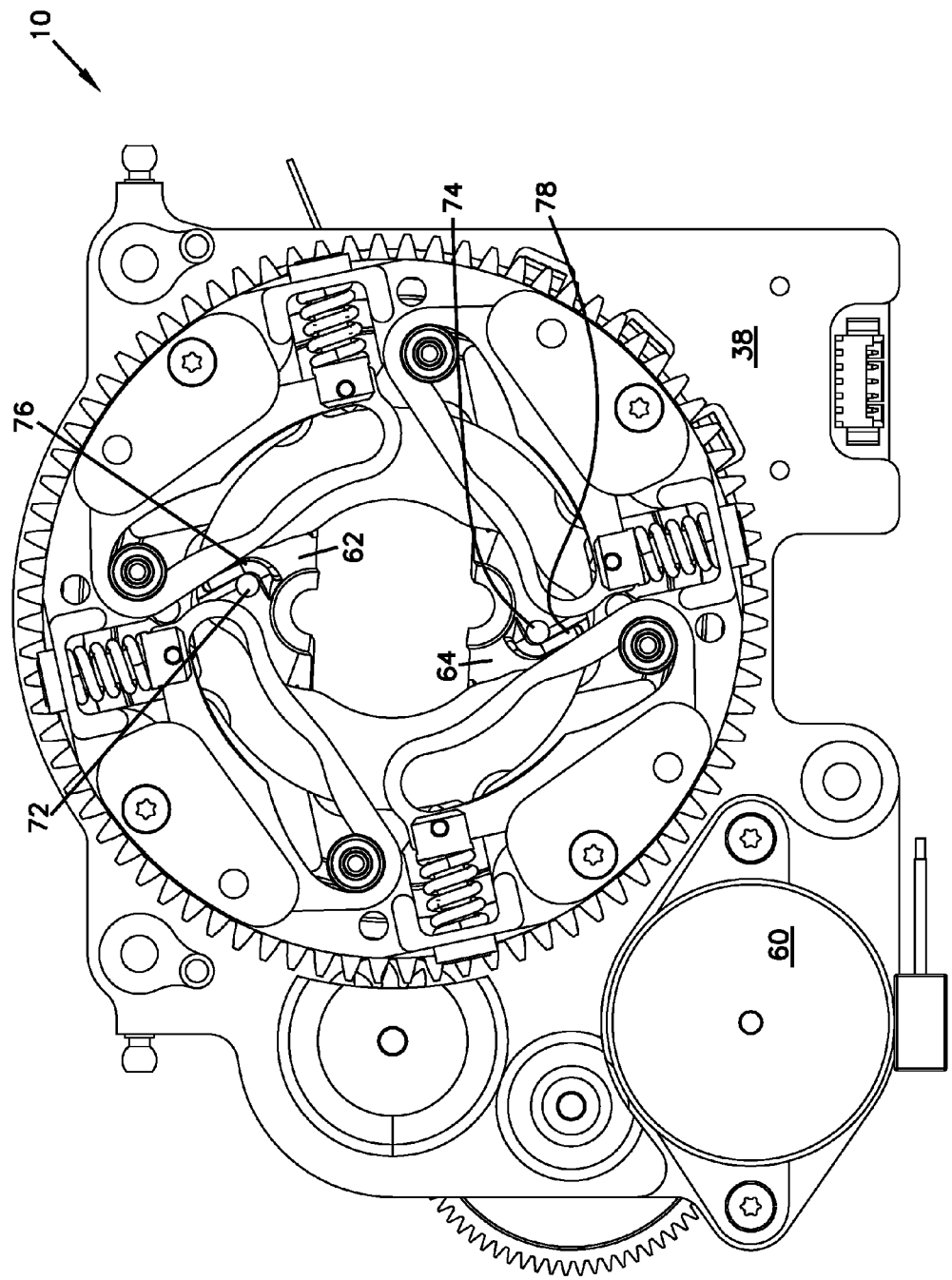
FIG. 14 is a rear view of the cable clamp assembly in the third state with portions removed.
Figure 15:
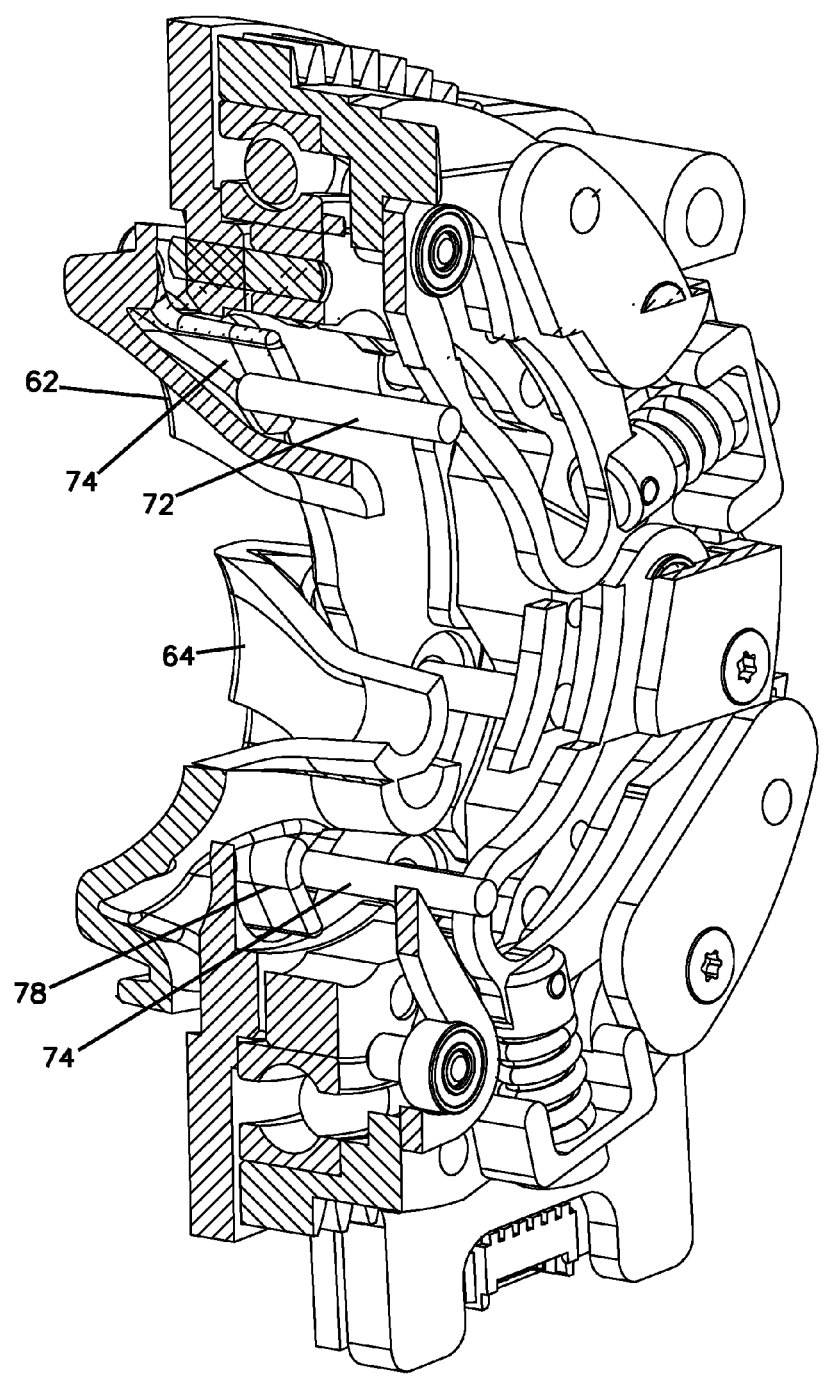
FIG. 15 is a cross-sectional view along 15-15 in FIG. 8.
Figure 16:
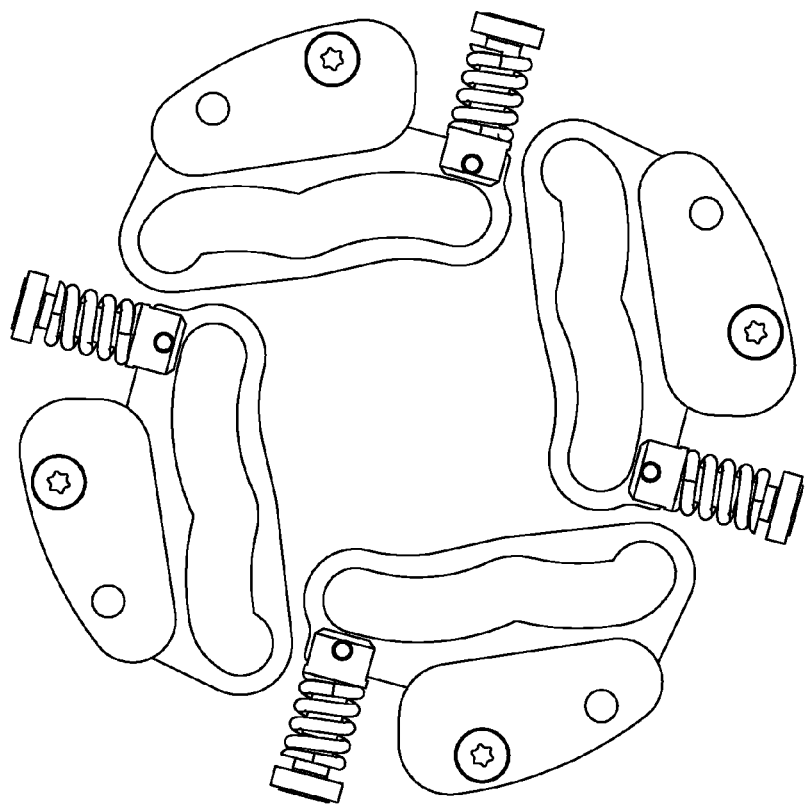
FIG. 16 is an elevation view of a portion of the fixed body component of the cable clamp assembly of FIG. 1.
Figure 17:
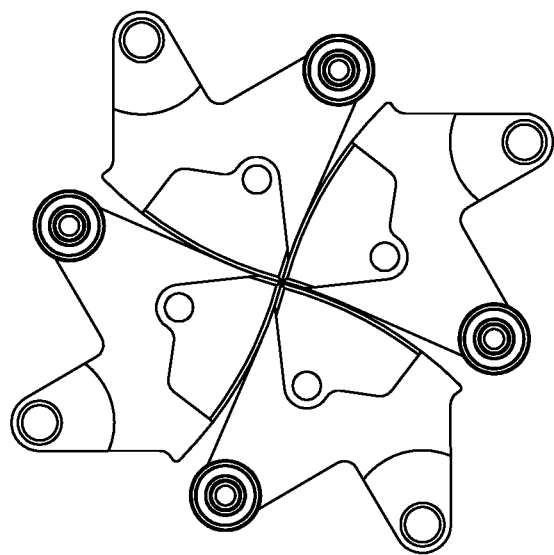
FIG. 17 is an elevation view of a portion of the cable engagement assembly of the cable clamp assembly of FIG. 1.
Figure 18:
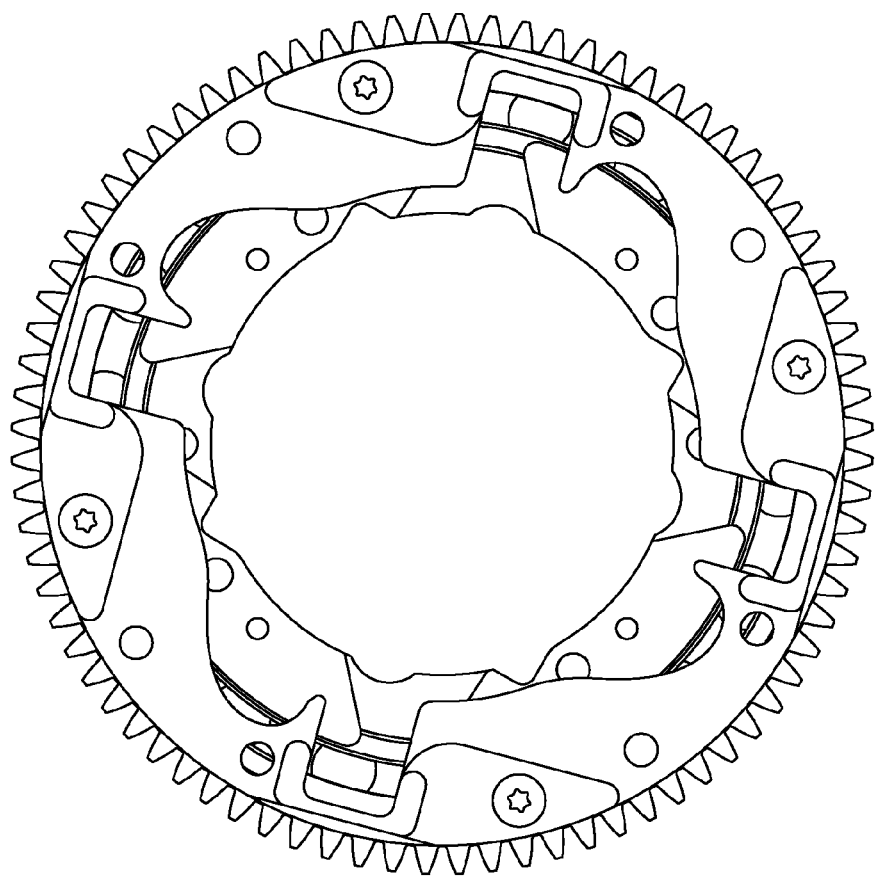
FIG. 18 is an elevation view of a portion of the rotating body component of the cable clamp assembly of FIG. 1.
Figure 19:
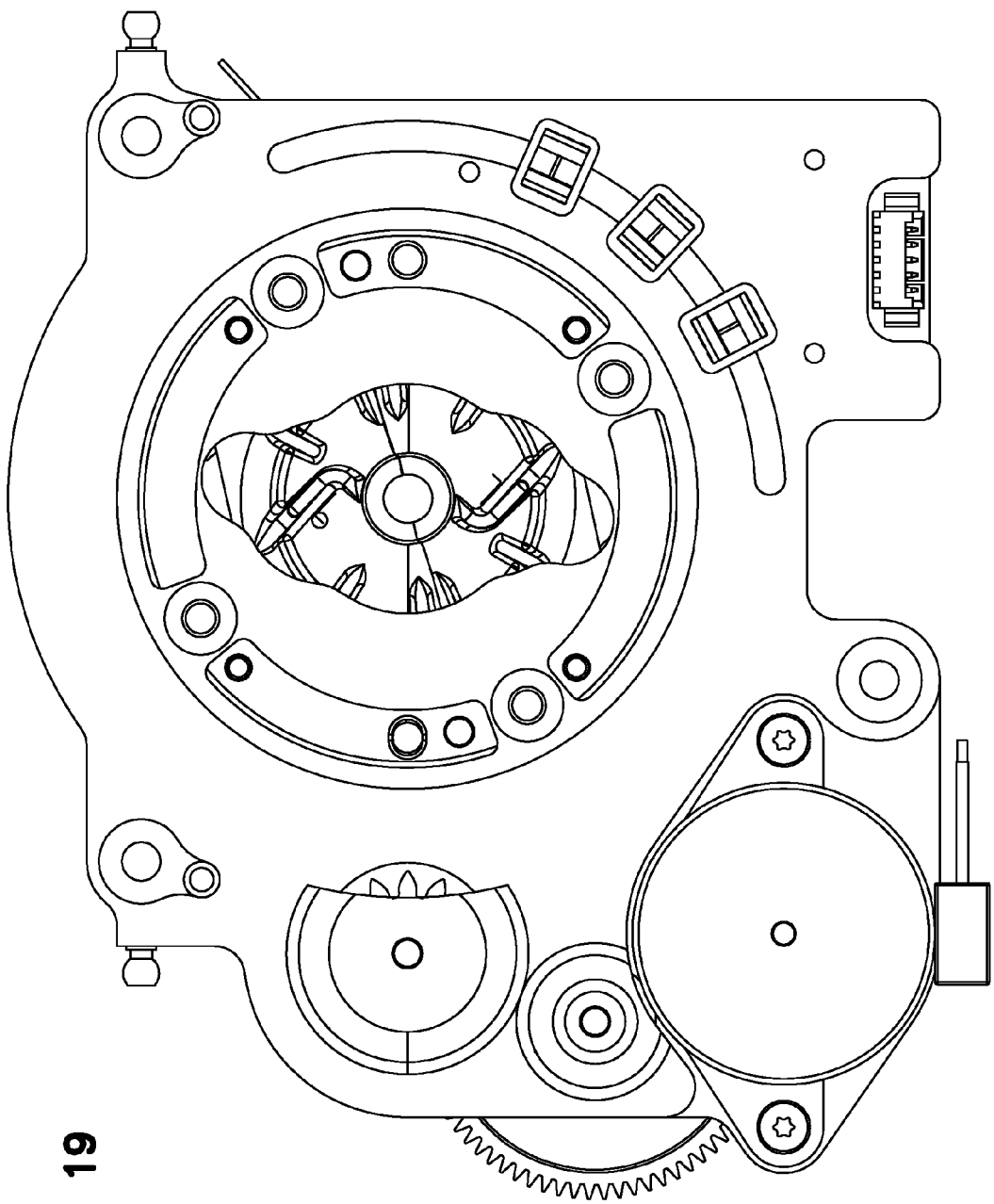
FIG. 19 is an elevation view of a portion of the force limiting radial drive assembly of the cable clamp assembly of FIG. 1.
Figure 20A:
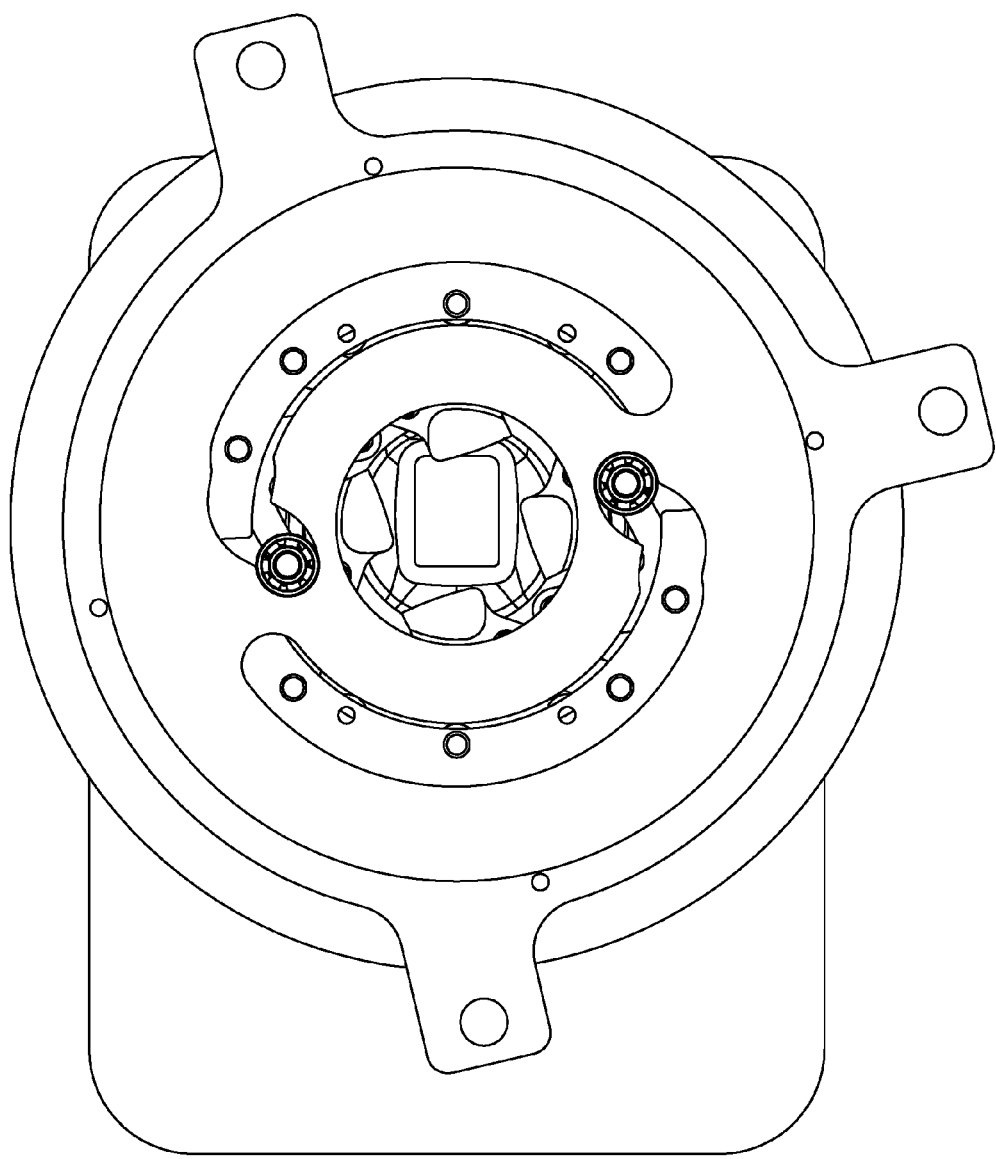
FIG. 20A is a rear view of an alternative embodiment of the cable clamp assembly in a first state.
Figure 20B:
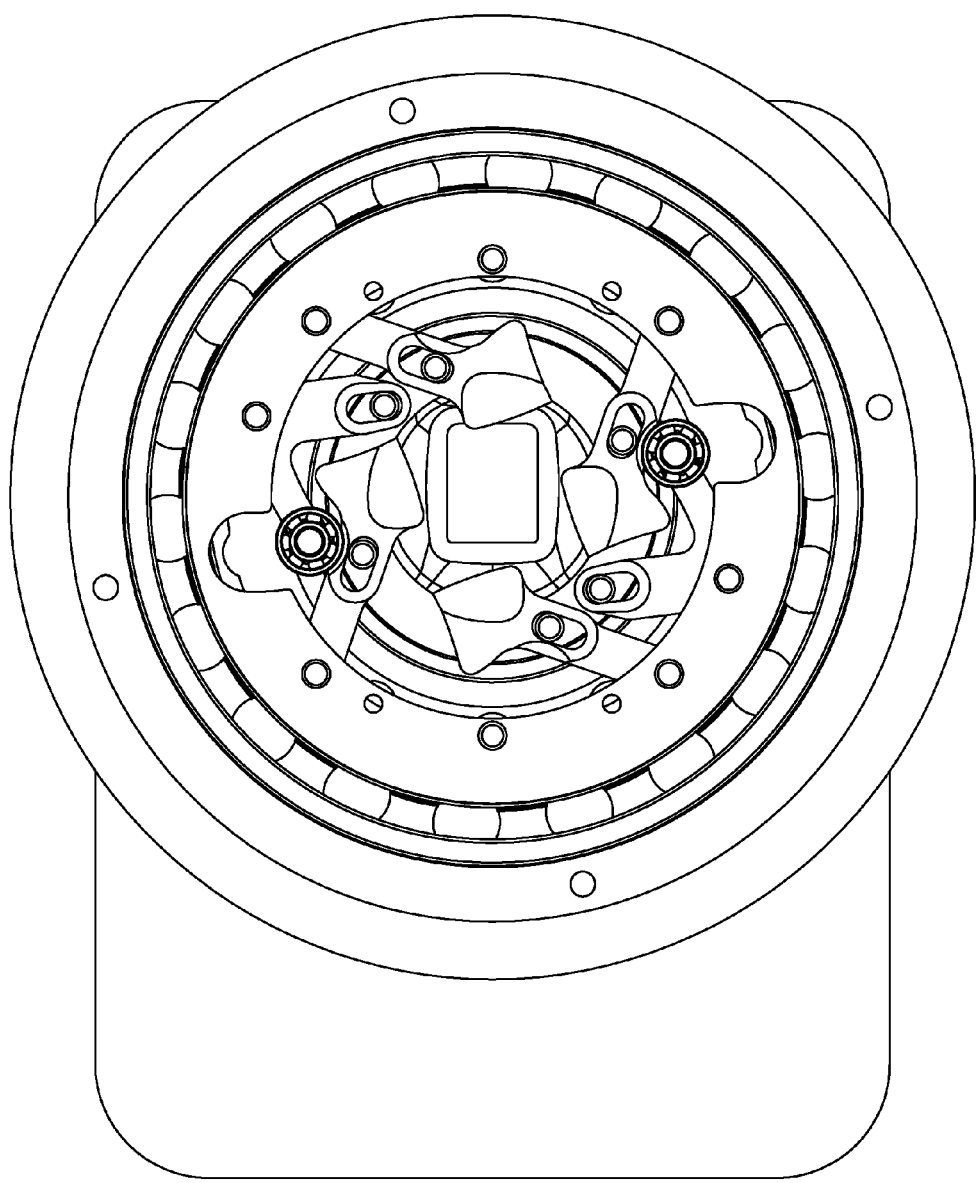
FIG. 20B is a rear view of the cable clamp assembly of FIG. 20A in the first state with certain portions removed.
Figure 20C:
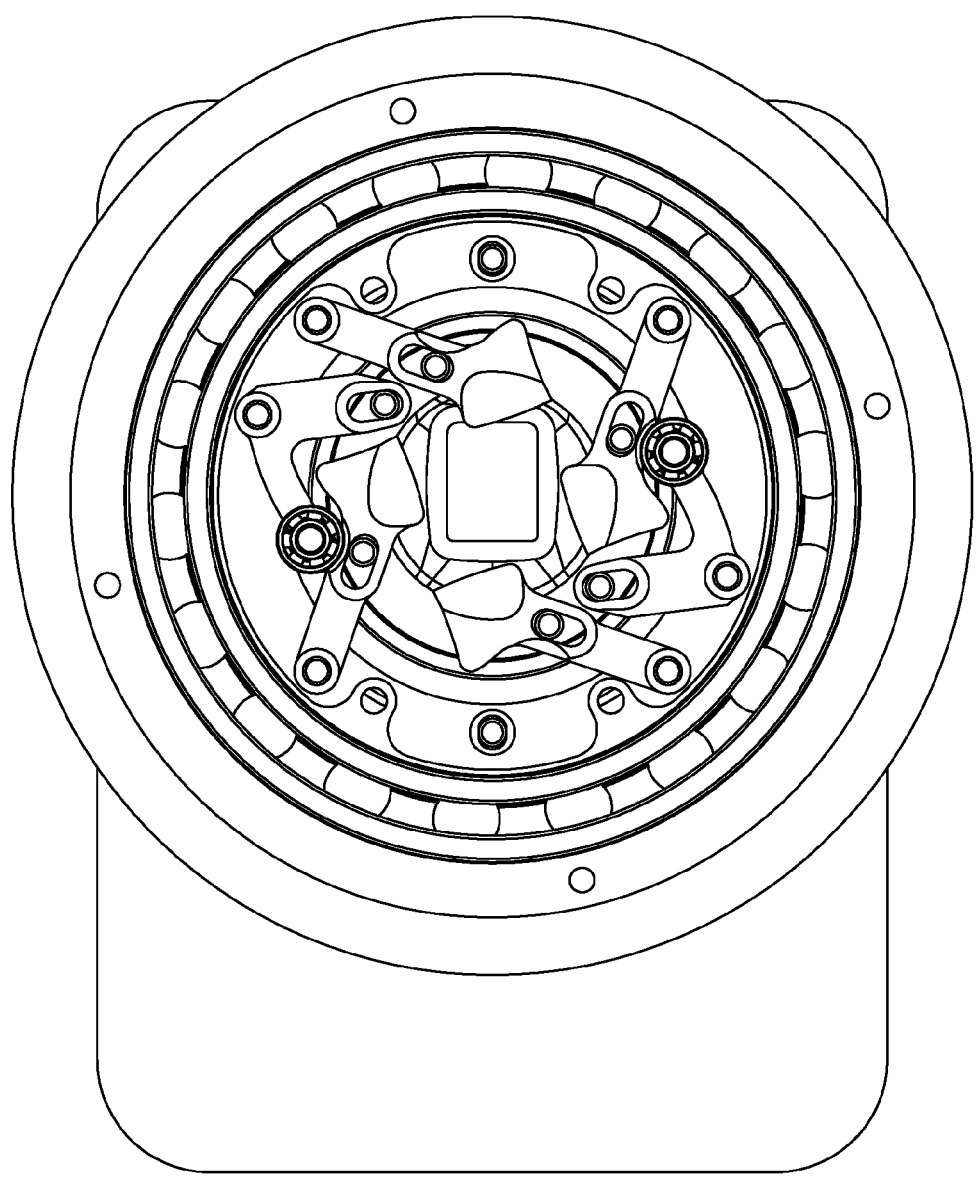
FIG. 20C is a rear view of the cable clamp assembly of FIG. 20A in the first state with additional portions removed relative to FIG. 20B.
Figure 20D:
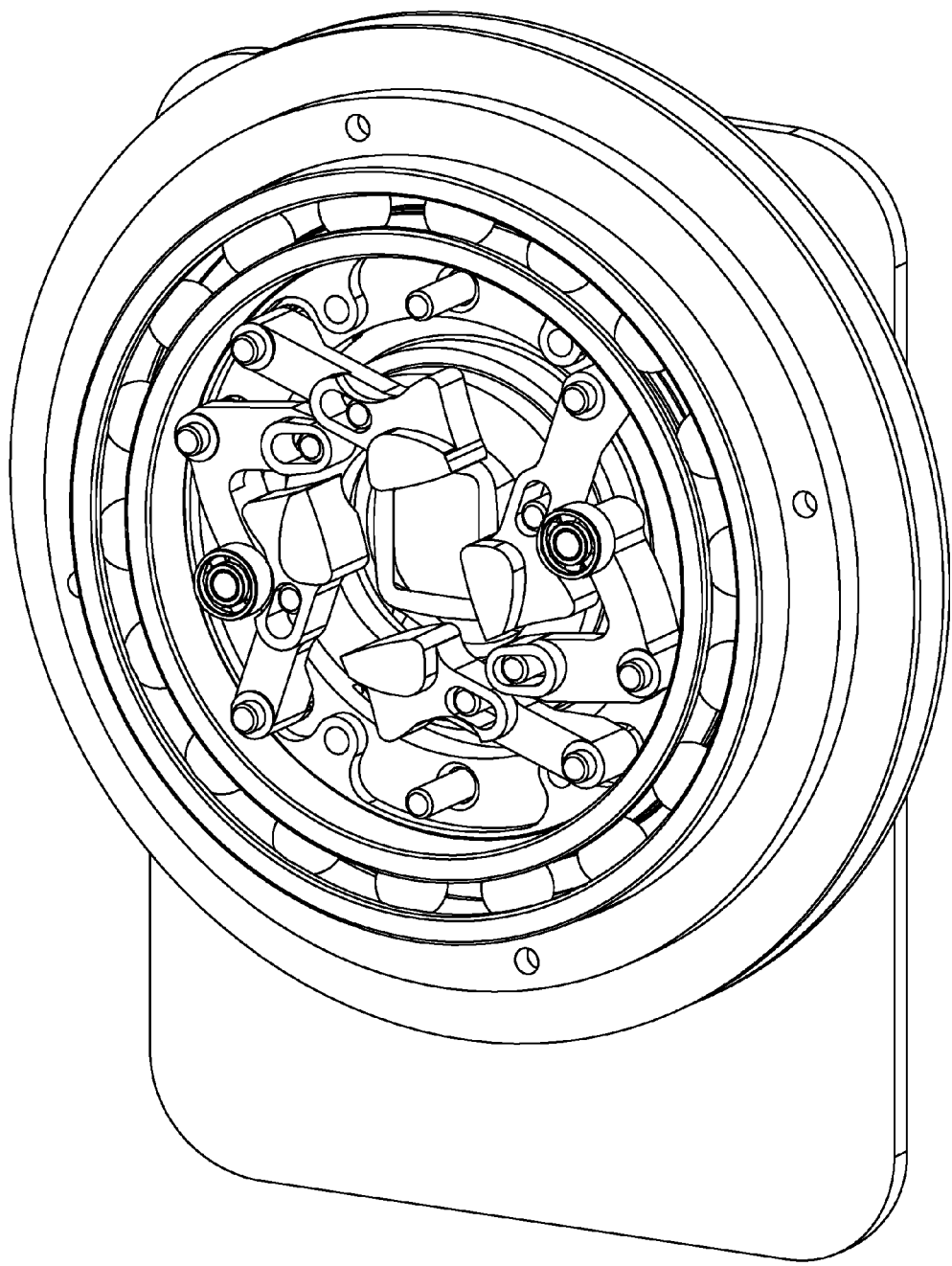
FIG. 20D is a rear perspective view of the cable clamp assembly of FIG. 20A in the first state.
Figure 21A:
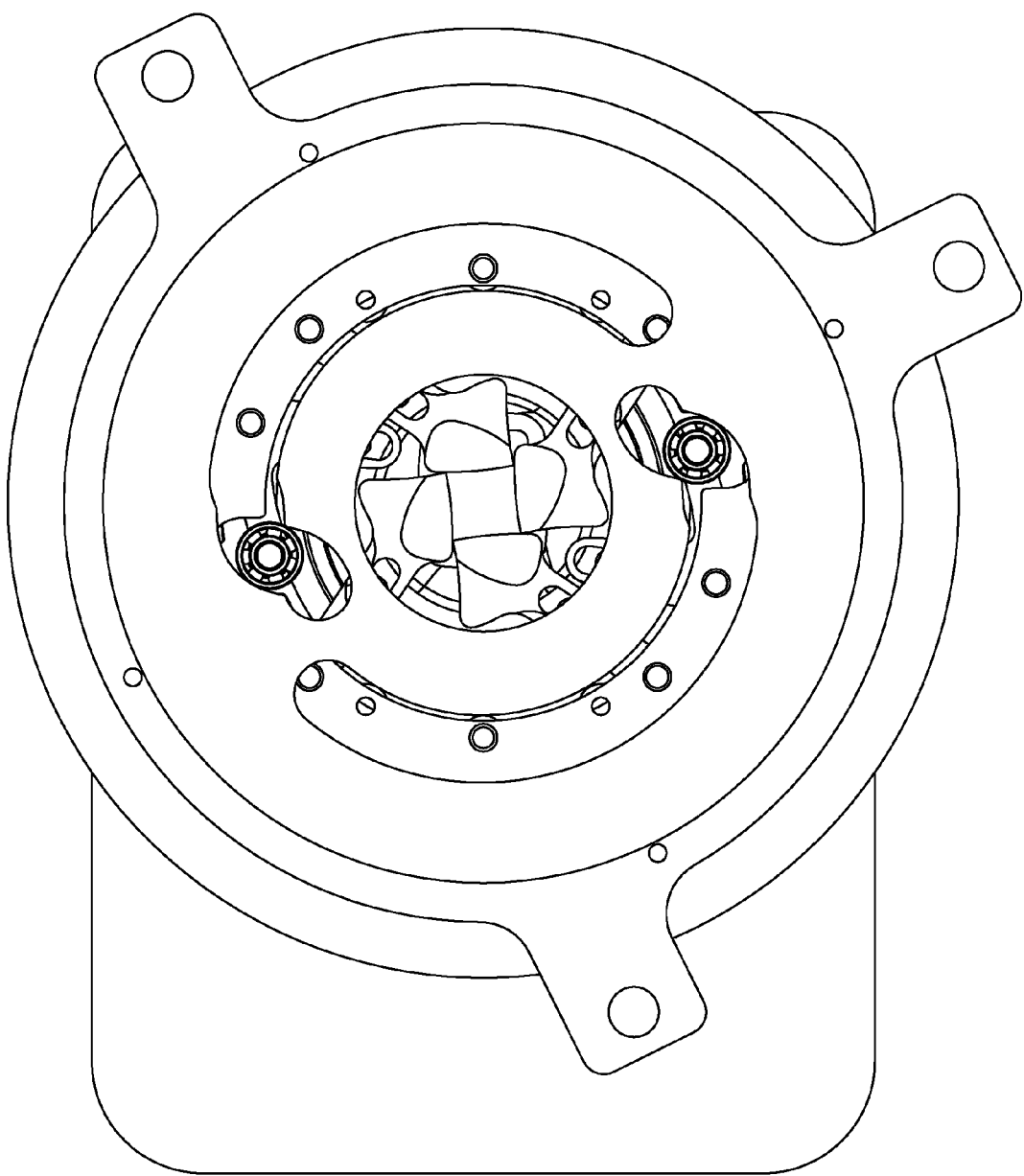
FIG. 21A is a rear view of an alternative embodiment of the cable clamp assembly in a second state.
Figure 21B:
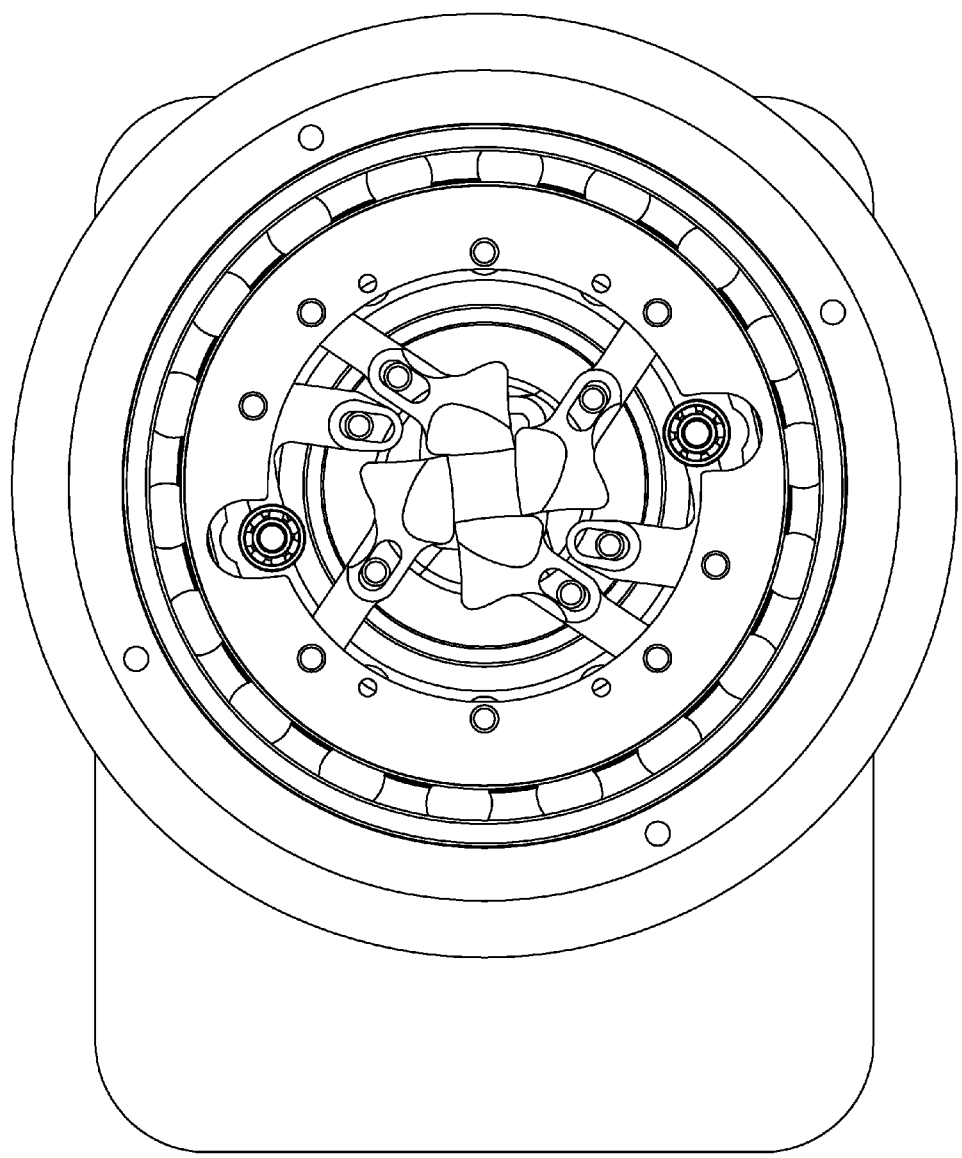
FIG. 21B is a rear view of the cable clamp assembly of FIG. 21A in the second state with certain portions removed.
Figure 21C:
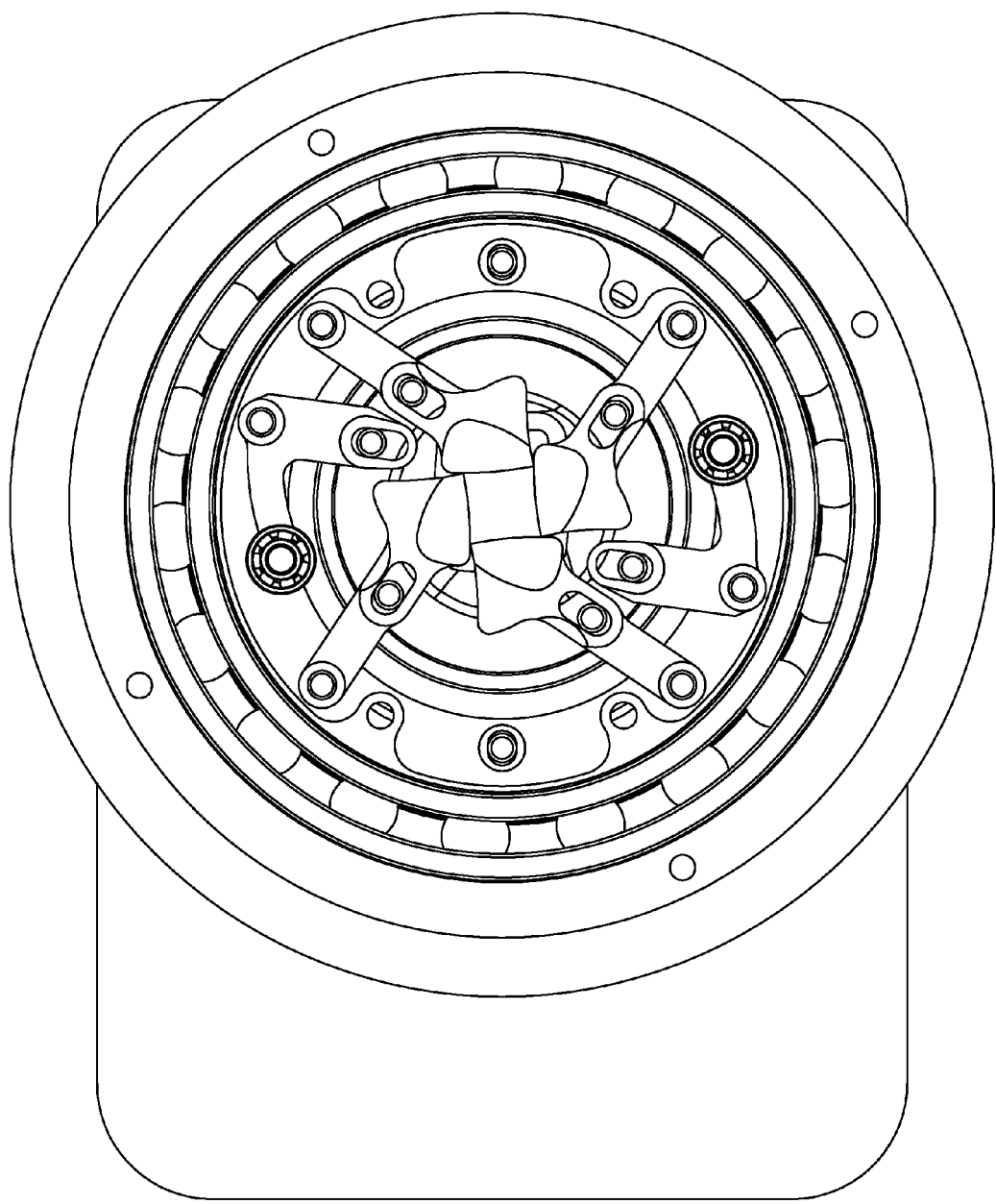
FIG. 21C is a rear view of the cable clamp assembly of FIG. 21A in the second state with additional portions removed relative to FIG. 21B.
Figure 21D:
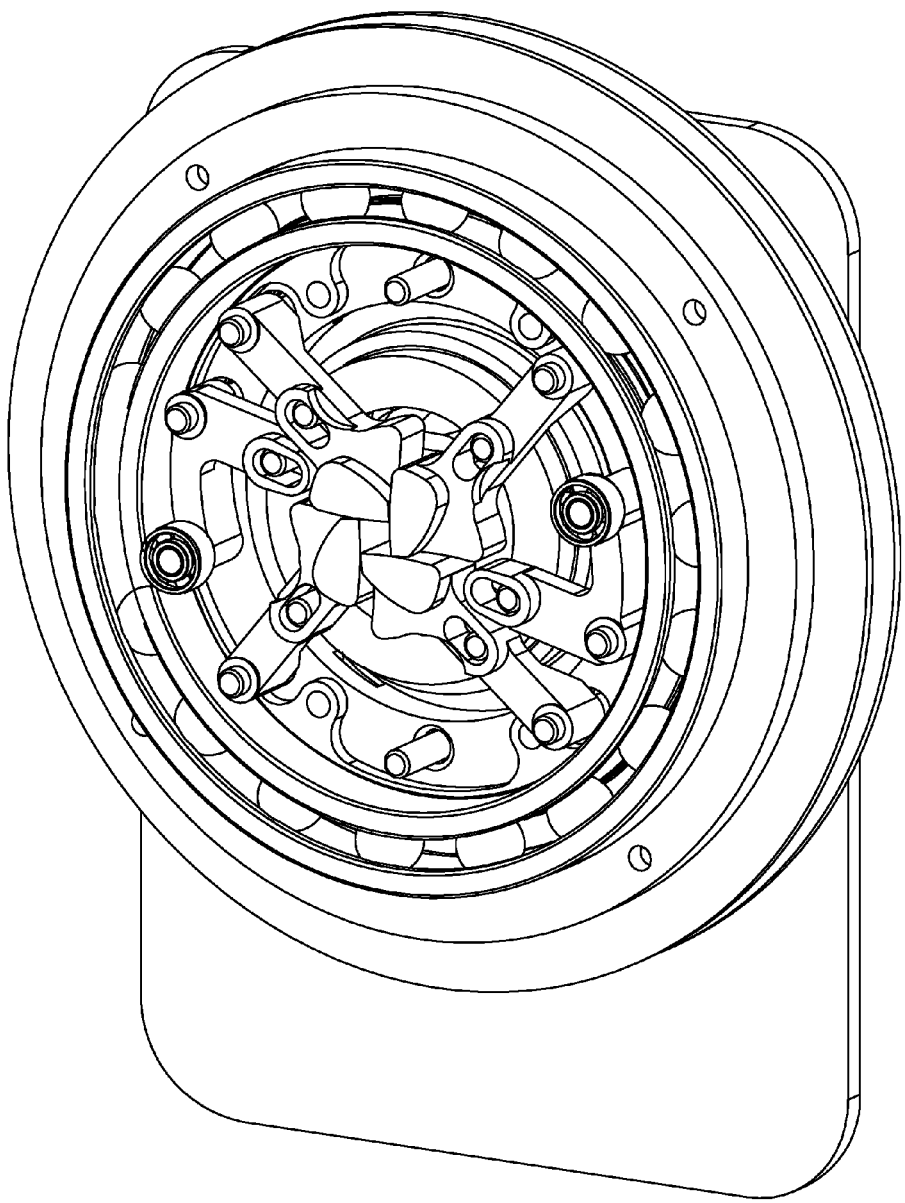
FIG. 21D is a rear perspective view of the cable clamp assembly of FIG. 21A in the second state.
Figure 22A:
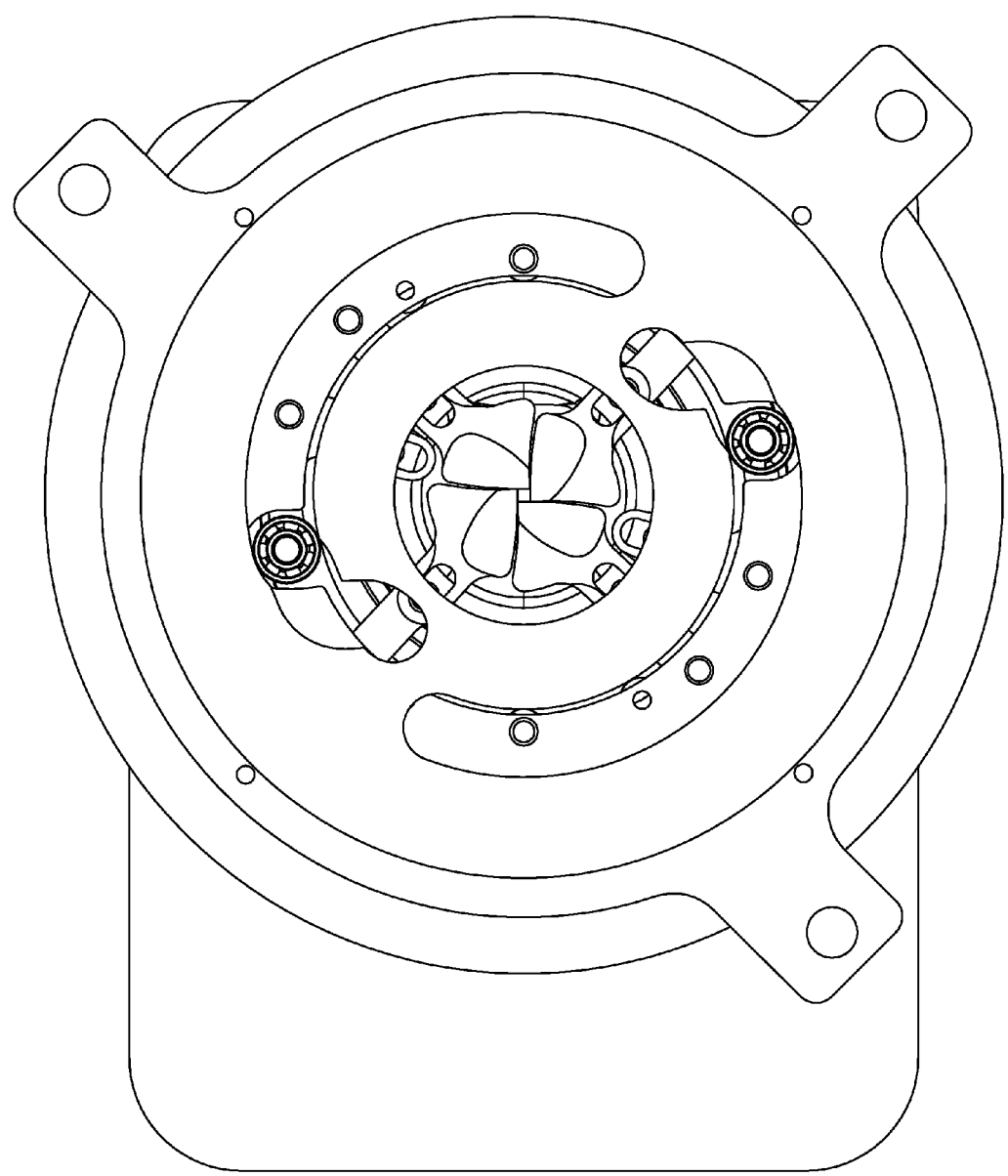
FIG. 22A is a rear view of an alternative embodiment of the cable clamp assembly in a third state.
Figure 22B:
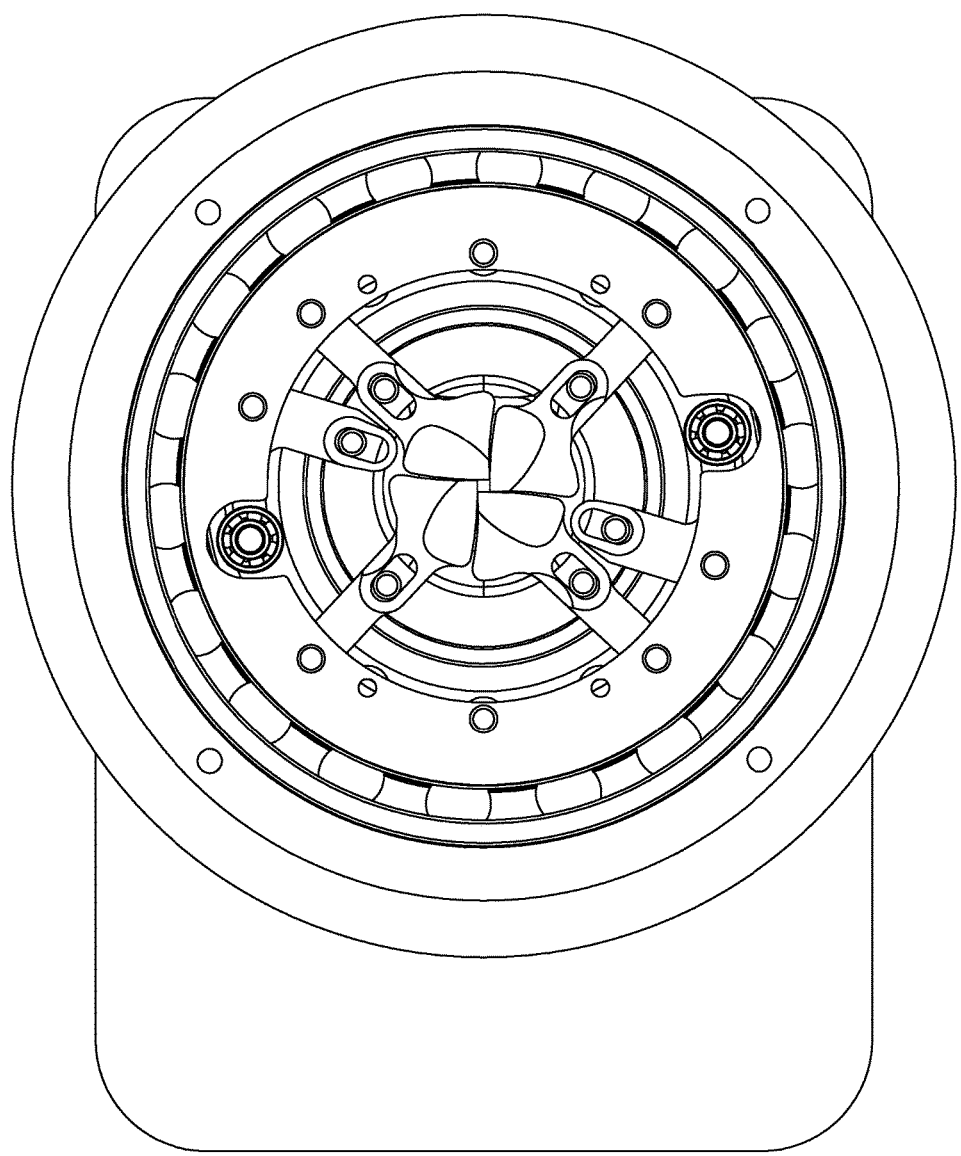
FIG. 22B is a rear view of the cable clamp assembly of FIG. 22A in the third state with certain portions removed.
Figure 22C:
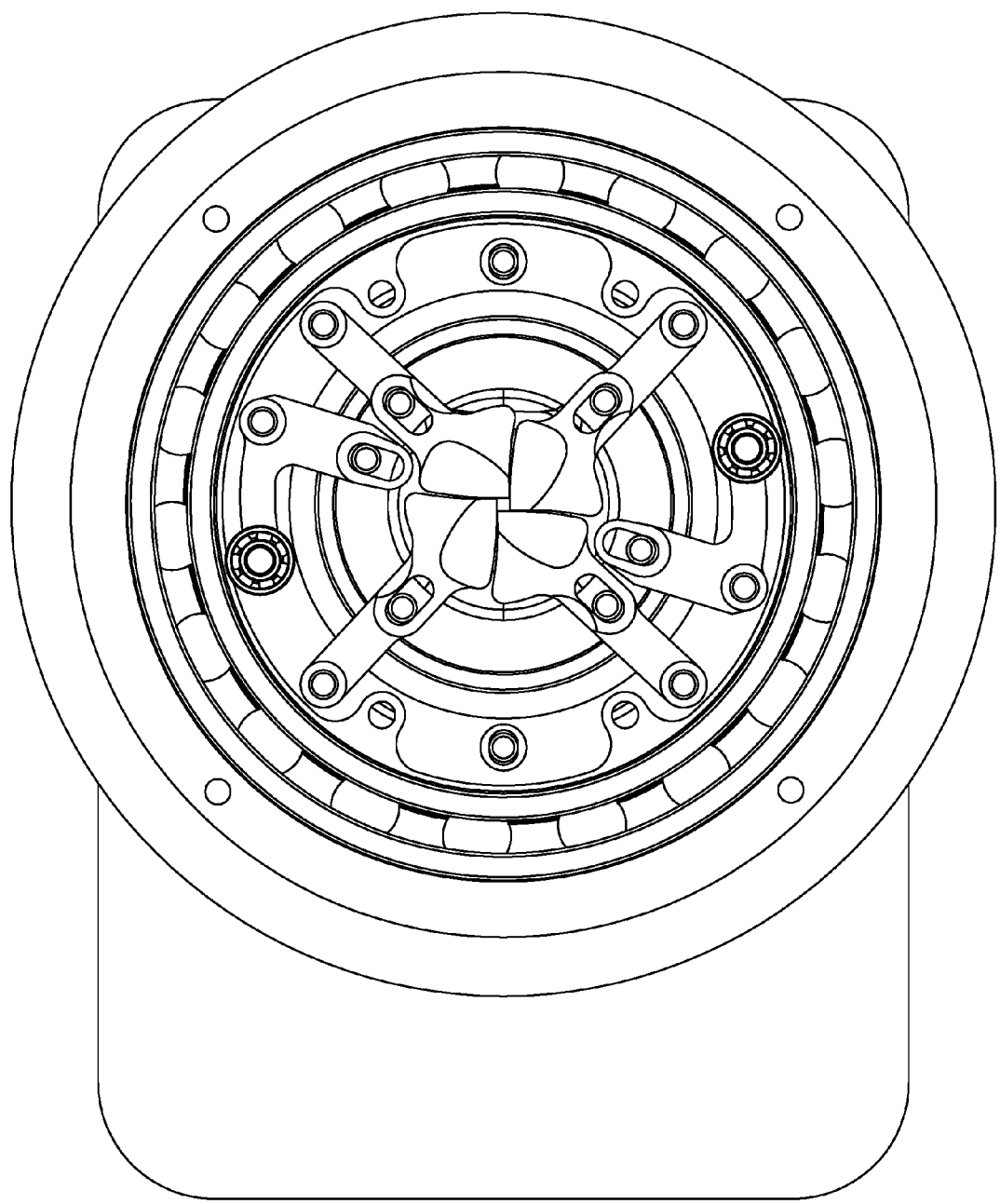
FIG. 22C is a rear view of the cable clamp assembly of FIG. 22A in the third state with additional portions removed relative to FIG. 22B.
Figure 22D:
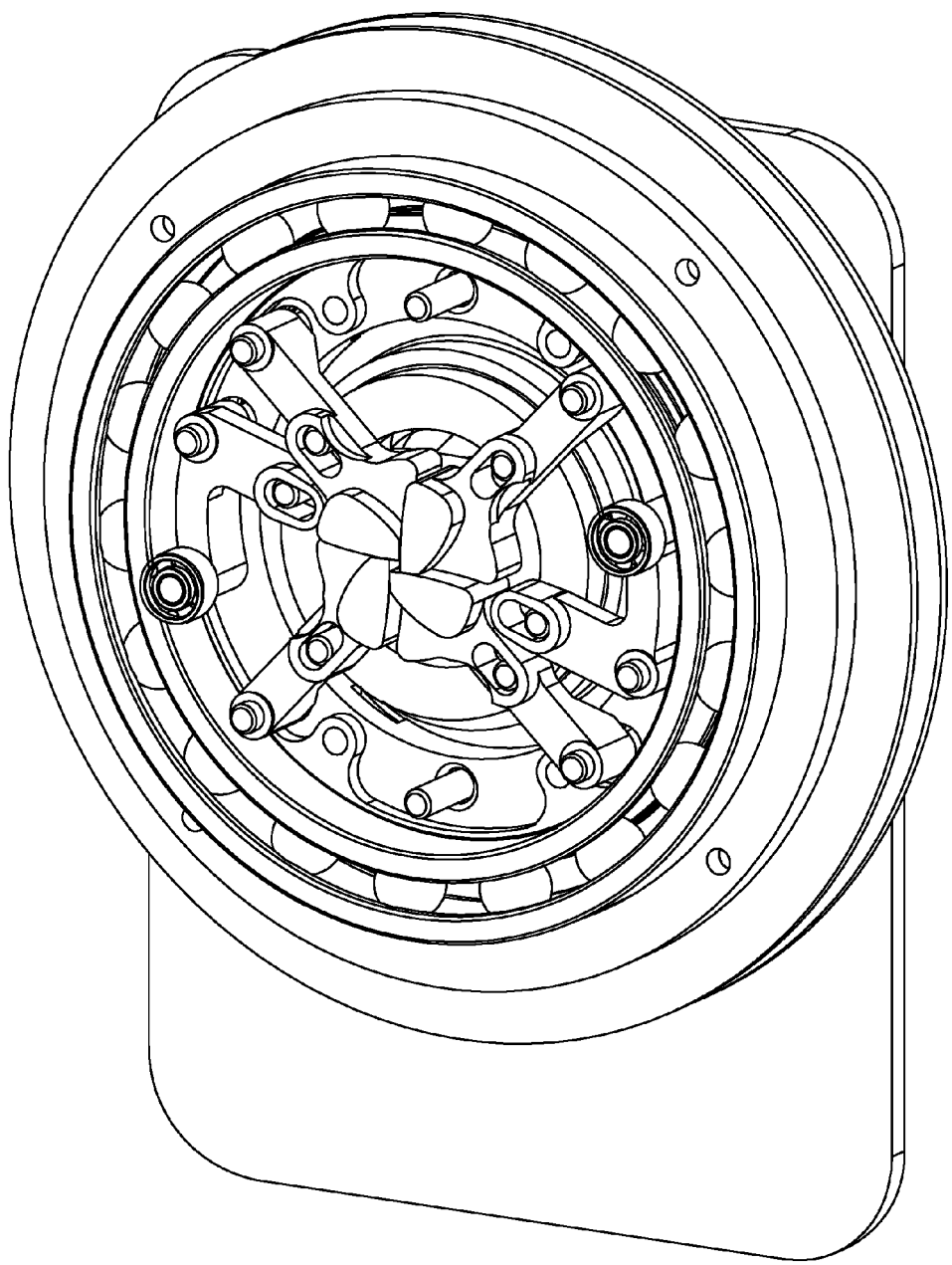
FIG. 22D is a rear perspective view of the cable clamp assembly of FIG. 22A in the third state.

In the depicted embodiment, the cable clamping assembly 10 of the present disclosure includes a number of subassemblies. Referring particularly to FIG. 3, the cable clamping assembly 10 includes a cable engagement assembly 12 configured to selectively apply pressure to an exterior section of a cable. The cable clamping assembly 10 includes a force limiting radial drive assembly 28 configured to radially drive the clamp arms 14, 16, 18, 20 and limit the force that the clamp arms 14, 16, 18, 20 apply onto the cable. The cable clamping assembly 10 includes a drive assembly 50 configured to transmit rotational movement from a drive shaft into radial movement of the cable engagement assembly 12. In addition, the cable clamping assembly 10 of the depicted embodiment includes a cable guide assembly 52 that facilitates guiding of the cable into and out of the cable clamping assembly. Each of these subassemblies will be described in greater detail below. It should be appreciated that alternative embodiments of the present disclosure may include more, fewer or different subassemblies.

In the depicted embodiment, the cable engagement assembly 12 includes a plurality of cable clamp arms 14, 16, 18, 20 arranged to surround a cable and simultaneously move towards a cable applying balanced forces to the exterior section of the cable. In the depicted embodiment, the cable engagement assembly 12 includes four cable clamp arms 14, 16, 18, 20 that cooperatively completely surround the cable. In the depicted embodiment, each of the four clamp arms shares the same features. As such, only one of the clamp arms will be described in greater detail herein. However, it should be appreciated that in alterative embodiments the cable engagement assembly could have more or fewer clamp arms and not all of the clamp arms need necessarily share the same structural features (i.e., the clamp arms can be different).

In the depicted embodiment, the clamp arm 14 includes a main body that defines a widened curved cable engagement surface 22. The cable engagement surface 22 has a width W1. In the depicted embodiment, the width of the body at an opposed edge is W2, and W1 is greater than W2 by 150 to 500 percent. In the depicted embodiment, the widened portion 42 of the clamp arm is formed of the same material as the main body portion. The widened portion 42 could be, for example, formed integral with the main body portion via an injection molding or machining process or, alternatively, formed separately and later connected to the main body of the clamp arm 14. This widened construction of the curved cable engagement surface 22 allows for more even distribution of force onto the cable and results in greater friction hold between the clamp arms and the cable while avoiding damage to the cable. In the depicted embodiment, the clamp arm 14 includes a beveled edge 48 at the junction between the rear face and curved cable engagement surface 22 and a scalloped lead in at the junction between the front face and the curved cable engagement surface 22. These features further minimize the risk of damage to the cable due to the engagement of the cable clamp arm 14 with the cable. It should be appreciated that many alternative clamp arm configurations are possible. For example, it should be appreciated that in alternative embodiments the clamp arms themselves may be constructed of more than one material and can be shaped differently than depicted herein.

In the depicted embodiment, the clamp arm 14 includes a clamp arm pivot 24 that pivotally connects the clamp arm 14 to a fixed body 38. In the depicted embodiment, the clamp arm pivot 24 is a boss that is inserted into an aperture 44 in the fixed body 38. It should be appreciated that many alterative configurations are possible including, for example, the pivot being an aperture on the clamp arm 14 that receives a boss that extends from the fixed body 38.

In the depicted embodiment, the clamp arm 14 includes a wheel 26 on a rear face that is configured to rotatably engage a channel 32 in a guide plate 46. Generally when the guide plate 46 moves relative to the clamp arm 14, the clamp arm 14 pivots about the clamp arm pivot 24 thereby causing radial displacement of the curved cable engagement surface 22. The construction and function of the guide plate 46 will be described in further detail as part of the description of the clamp arm drive assembly 28. As will be explained below, once a certain amount of force has been applied to the cable via the clamp arms, the guide plate 46 will pivot radially outward instead of causing radial inward displacement of the curved cable engagement surface 22.

In the depicted embodiment, the curved cable engagement surface 22 includes a curvature that facilitates smooth synchronized motion between the plurality of clamp arms 14, 16, 18, 20. In the depicted embodiment, portions of the curved cable engagement surface 22 include a radius of curvature that corresponds to half the distance between opposed clamp arm pivots 24. In the depicted embodiment, the curved cable engagement surface 22 includes a constant radius of curvature. It should be appreciated that many alternative configurations are also possible.

As discussed above, the cable clamping assembly 10 includes a force limiting radial drive assembly 28 configured to radially drive the clamp arms and limit the force that the clamp arms apply onto the cable. The cable clamp arm drive assembly 28 will be discussed in further detail below. In the depicted embodiment, the cable clamp drive assembly 28 includes a plurality of guide plates 46. In the depicted embodiment, the clamp arm drive assembly 28 includes four guide plates 46. Each of the guide plates correspond to a different clamp arm and share the same features and functions. Accordingly, only a single guide plate 46 will be described in further detail herein. It should be appreciated that alternative embodiments may not include guide plates or may include fewer or more guide plates.

In the depicted embodiment, the guide plate 46 includes a channel 32 configured to engage the wheel 26 of the cable clamp arm 14. As the guide plate 46 moves, the wheel 26 rolls in the channel and causes the clamp arm 14 to pivot about the clamp arm pivot 24. The pivoting of the clamp arm 14 results in radial displacement of the curved cable engagement surface 22. In the depicted embodiment, the channel 32 of the guide plate 46 includes a non-uniform profile including a first portion having a first curved shaped configured to drive the clamp arm radially at a first speed, and a second portion having a shape configured to drive the clamp arm radially at a second speed, the second speed being slower than the first speed. In the depicted embodiment, the transition is set based on when it is expected that the cable clamp 14 initially would contact the cable.

In the depicted embodiment, the guide plate 46 includes a guide plate pivot 34, which is pivotally connected to a guide plate support arm 36. The guide plate support arm 36 is connected to the rotating body 40. As the rotating body rotates, the guide plate support arm 36 moves with the rotating body 40, which causes the guide plate 46 to move. The movement of the guide plate, as discussed above, drives the radial displacement of the curved cable engagement surface 22 of the cable clamp arm 14.

In the depicted embodiment, a clamp force limiting device 30 is connected between the rotating body 40 and the guide plate 46. The clamp force limiting device is configured to limit the amount of force that can be applied to the cable to prevent damage to the cable. In the depicted embodiment, the clamp force limiting device functions while allowing a full range of motion of the drive assembly.

In the depicted embodiment, the clamp force limiting device is a coil spring with a known preload. In the depicted embodiment, once the cable clamp arm 14 imparts a predetermined amount of force on the cable, the cable clamp arm 14 stops displacing towards the cable, thereby limiting the amount of force that is imparted onto the cable. The displacement stops even as the rotating body 40 continues to rotate.

As discussed above, the cable clamping assembly 10 includes a drive assembly 50 configured to transmit rotational movement from a drive shaft into radial movement of the cable engagement assembly 12. The drive assembly 50 will be discussed in further detail below. In the depicted embodiment, the drive assembly 50 includes a fixed body 38 and a rotating body 40. In the depicted embodiment, a bearing assembly 56 interfaces between the fix body 38 and rotating body 40 to facilitate relative rotation therebetween.

In the depicted embodiment, the fix body 38 can include multiple parts that are connected together to form a structure that is stationary. In the depicted embodiment, the fixed body 38 includes a portion that is pivotally connected to the clamp arm pivot 24. In the depicted embodiment, the rotating body 40 of the drive assembly 50 is configured to rotate relative to the fixed body 38. In the depicted embodiment, the guide plate support arm 36 is connected to the rotating body 40 and supports the guide plate 46 thereon. In the depicted embodiment, the rotating body 40 includes a number of structural components connected to each other. In the depicted embodiment, the periphery portion of the rotating body 40 includes a ring gear 58 for driving the rotation thereof and the drive assembly also includes a drive gear 84 supported on the fixed body 38 that is configured to cause the rotation of the ring gear 58 of the rotating body 40.

The cable clamping assembly 10 of the depicted embodiment also includes a cable guide assembly 52. The cable guide assembly 52 is configured to facilitate the insertion of a cable into the cable clamping assembly 12. The cable guide assembly expands to allow the cable to be easily removed. This is especially advantageous when the end of the cable has been connectorized and has a much greater cross-sectional area than the cable itself. In the depicted embodiment, the cable guide assembly has a tapered funnel shape and includes a first portion 62 and a second portion 64. The first portion 62 is configured to move away from the second portion 64 against a spring force as the cable clamps are retracted to allow for the easy retraction of the end of the cable from the cable clamp assembly 10.

The present disclosure also provides a method of clamping a cable. In one embodiment of the method, the method includes the steps of axially feeding an end of a cable through a funnel shaped cable guide assembly 52 and through a plurality of clamp arms 14, 16, 18, 20, wherein the clamp arms are co-planar and completely surround the cable. The method includes the step of radially driving the plurality of clamp arms 14, 16, 18, 20 towards the cable in a synchronized first rate and radially driving the plurality of clamp arms towards the cable in a synchronized second rate after the first rate, wherein the second rate is slower than the first rate. The method includes the step of stopping the radial movement once a predetermined amount of force is applied to the exterior of the cable by the clamp arms. In the depicted embodiment, the step of radially driving the plurality of clamp arms towards the cable in a synchronized first rate and radially driving the plurality of clamp arms towards the cable in a synchronized second rate, as well as the step of stopping the radially movement once a predetermined amount of force is applied to the exterior of the cable by the clamp arms, occurs without changing the output shaft 66 speed or toque on a motor 60 that drives the plurality of cable clamps 14, 16, 18, 20.

In the depicted embodiment, the first rate is based on the shape of a first aperture 68 in the guide plate 46, and the second rate is based on the shape of a second aperture 70 in the guide plate. In the depicted embodiment, the radial movement is stopped once a spring is compressed with a predetermined amount of force. This stopping prevents damage to the cable yet avoids the need to precisely control the motor and/or provide the motor controller with feedback regarding the force applied to the cable.

In some embodiments of the method, the method also includes the step of connecting a connector to the end of the cable (i.e., connectorizing the cable). In such embodiments, the connector may have a cross-sectional area that is greater than 150 percent of the cross-sectional area of the cable (e.g., 1.5-10 times the cross-sectional area of the cable). To allow for easy removal of the relatively large connectorized cable end, the method includes the step of automatically separating the funnel shaped guide to allow for easily retracting the end of the cable. In the depicted embodiment, the clamp arm 14 includes a first boss 72 that extends forward that selectively engages first flange 76 on the first body portion 62 of the cable guide assembly 52. Likewise, the clamp arm 18 includes a second boss 74 that extends forward that selectively engages second flange 78 on the second body portion 64 of the cable guide assembly 52. Once the clamp arm 14 rotates a set amount in the opening direction, the first boss 72 drives against the first flange 76 causing the first body portion 62 to pivot about the first pivot 80. Similarly, once clamp arm 18 rotates a set amount in the opening direction, the second boss 74 is driven against the second flange 78 resulting in the rotation of the second body portion 64 about the second pivot. Consequently, the rotation of the cable clamp arms 14, 18 in an opening direction drives the first body portion 62 and second body portion 64 to separate. See FIGS. 12-14. In the depicted embodiment the body portions of the funnel shaped guide are spring biased towards a closed position. It should be appreciated that many other alternative configurations are also possible.

FIGS. 20-22 show an alternative cable clamp assembly, with rotating clamp arms, and a wheel and slot arrangement for moving the clamp arms. FIGS. 20A-D show the cable clamp assembly in a first position. FIGS. 21A-D show the cable clamp assembly in a second position. FIGS. 22A-D show the cable clamp assembly in a third position.

The above specification, examples and data provide a complete description of the manufacture and use of the composition of the invention. Since many embodiments of the invention can be made without departing from the spirit and scope of the invention, the invention resides in the claims hereinafter appended.

PARTS LIST

10 cable clamping assembly
12 cable engagement assembly
14 cable clamp arm
16 cable clamp arm 18 cable clamp arm
20 cable clamp arm
22 curved cable engagement surface of clamp arm
24 clamp arm pivot
26 wheel on clamp arm
28 force limiting radial drive assembly
30 clamp force limiting device
32 channel in guide plate
34 guide plate pivot
36 guide plate support arm
38 fixed body
40 rotating body
42 widened portion of clamp arm
44 aperture in the fixed body
46 guide plate
48 beveled edge
50 drive assembly
52 cable guide assembly
54 scallop on cable clamp arm
56 bearing assembly
58 ring gear
60 motor
62 first portion of the cable guide assembly
64 second portion of the cable guide assembly
66 output shaft
68 first aperture
70 second aperture
72 first boss
74 second boss
76 first flange
78 second flange
80 first pivot
82 second pivot
84 drive gear

What is claimed is:
1. A cable clamping assembly (10) comprising:
a cable engagement assembly (12) configured to selectively apply pressure to an exterior section of a cable, the cable engagement assembly including:
a plurality of cable clamp arms (14, 16, 18, 20) arranged to surround a cable and simultaneously move towards a cable to apply force to the exterior section of the cable, wherein at least one of the plurality of clamp arms includes:
a curved cable engagement surface (22);
a clamp arm pivot (24); and
a wheel (26);
a force limiting radial drive assembly (28) configured to radially drive the clamp arms (14, 16, 18, 20) and limit the force that the clamp arms (14, 16, 18, 20) apply onto the cable, the force limiting radial drive assembly (28) including:
a plurality of guide plates (46), where at least one of the plurality of guide plates (46) include:
a channel (32) configured to engage the wheel (26) of the clamp arm (14);
a guide plate pivot (34);
a clamp force limit device (30) operably connected to the guide plate (46);
a guide plate support arm (36) that is pivotally connected (38) to the guide plate pivot (34);
a drive assembly (50) configured to transmit rotational movement from a drive shaft into radial movement of the cable engagement assembly, the drive assembly including:
a fixed body (38) that is pivotally connected to the clamp arm pivot (24), wherein the clamp arm pivot (24) is pivotally connected to the fixed body;
a rotating body (40) configured to rotate relative to the fixed body (38), wherein the guide plate support arm (36) is connected to the rotating body (40).

2. The cable clamping assembly of claim 1, further comprising a cable guide assembly (52), the cable guide assembly including: a first body portion (62) and a second body portion (64) that cooperate to form a funnel shaped structure that is axially aligned with the cable engagement assembly (12), the first body portion (62) and second body portion (64) are configured to separate.

3. The cable clamping assembly of claim 2, wherein the rotation of the cable clamp arms (14, 18) in an opening direction drives the first body portion (62) and second body portion (64) apart.

4. The cable clamping assembly of claim 1, wherein the force limiting radial drive assembly (28) is mounted to the rotating body (40) such that when the rotating body (40) rotates, the force limiting radial drive assembly (28) rotates along with the rotating body (40).

5. The cable clamping assembly of claim 1, wherein the rotating body (40) includes a ring gear (58) for driving the rotation thereof, and wherein the drive assembly (50) further comprises a drive gear (84) supported on the fixed body (38) configured to cause the rotation of the ring gear (58) of the rotating body.

6. The cable clamping assembly of claim 1, further comprising a bearing assembly (56) that interfaces between the fixed body (38) and the rotating body (40).

7. The cable clamping assembly of claim 1, wherein the clamp arm (14) includes a front face and a rear face, the front face including a scalloped lead in.

8. The cable clamping assembly of claim 1, wherein the cable engagement surface of the clamp arm has a width W1 and wherein the width of an opposed edge of the clamp arm has a width W2, wherein W2 is 150-500 percent larger than W1.

9. The cable clamping assembly of claim 1, wherein the cable engagement assembly includes four cable clamp arms that cooperatively completely surround the cable.

10. The cable clamping assembly of claim 9, wherein each of the cable clamp arms (14, 16, 18, 20) include a curved cable engagement surface (22); a clamp arm pivot (24); and a wheel (26).

11. The cable clamping assembly of claim 1, wherein the curved cable engagement surface (22) includes a portion having a constant radius of curvature that is set based on the distance between opposed clamp arm pivots (24).

12. The cable clamping assembly of claim 1, wherein the force limiting radial drive assembly (28) includes four guide plates (46), wherein each guide plate drives a separate clamp arm, wherein each of the guide plates includes a first aperture (68) defining a first curve and a second aperture (70) defining a second curve, wherein the first aperture (68) is open to the second aperture (70) thereby defining a continuous channel for engagement with a wheel (26) of a clamp arm that it drives and wherein the curve of the first aperture (68) is greater than the curve of the second aperture (70).

13. The cable clamping assembly of claim 1, wherein the channel of the guide plate (46) includes a non-uniform profile including a first portion having a first curved shaped configured to drive the clamp arm radially at a first speed, and a second portion having a shape configured to drive the clamp arm radially at a second speed, the second speed being slower than the first speed.

14. The cable clamping assembly of claim 1, wherein the force limiting device 30 is a spring.

15. A cable clamping assembly (10) comprising:
   a cable engagement assembly (12) configured to selectively apply pressure to an exterior section of a cable, the cable engagement assembly including:
      a plurality of cable clamp arms (14, 16, 18, 20) arranged to surround a cable and simultaneously move towards a cable to apply force to the exterior section of the cable, wherein the plurality of clamp arms (14, 16, 18, 20) each includes:
         a curved cable engagement surface (22); and
         a clamp arm pivot (24);
      a wheel (26) connected to at least one of the plurality of clamp arms (14, 16, 18, 20);
   a radial drive assembly (28) configured to radially drive the clamp arms (14, 16, 18, 20), the radial drive assembly (28) including a guide plate (46), including a channel (32) configured to engage the wheel (26);
   a drive assembly (50) configured to transmit rotational movement from a drive shaft into radial movement of the cable engagement assembly, the drive assembly including:
      a fixed body (38) that is pivotally connected to the clamp arm pivot (24); and
      a rotating body (40) configured to rotate relative to the fixed body (38), wherein the guide plate (46) is connected to the rotating body (40).

* * * * *